US010616887B2

United States Patent
Shao et al.

(10) Patent No.: US 10,616,887 B2
(45) Date of Patent: Apr. 7, 2020

(54) DATA COMMUNICATION METHOD, TERMINAL DEVICE, AND NETWORK DEVICE

(71) Applicant: Huawei Technologies Co., Ltd., Shenzhen (CN)

(72) Inventors: Jiafeng Shao, Beijing (CN); Sha Ma, Beijing (CN); Chaojun Li, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/023,700

(22) Filed: Jun. 29, 2018

(65) Prior Publication Data

US 2018/0310305 A1    Oct. 25, 2018

Related U.S. Application Data

(63) Continuation of application No. PCT/CN2015/099920, filed on Dec. 30, 2015.

(51) Int. Cl.
*H04L 12/28* (2006.01)
*H04W 72/04* (2009.01)
(Continued)

(52) U.S. Cl.
CPC ......... *H04W 72/0446* (2013.01); *H04W 8/24* (2013.01); *H04W 24/10* (2013.01); *H04W 72/042* (2013.01); *H04W 72/1289* (2013.01)

(58) Field of Classification Search
CPC ...................................................... H04L 12/50
(Continued)

(56) References Cited

U.S. PATENT DOCUMENTS 10,313,990 B2 * 6/2019 Sadeghi ............... H04L 5/0053
2014/0211770 A1   7/2014 Englund et al.
(Continued)

FOREIGN PATENT DOCUMENTS

CN   101296508 A   10/2008
CN   101790202 A   7/2010
(Continued)

OTHER PUBLICATIONS

"3rd Generation Partnership Project;Technical Specification Group Radio Access Network;Evolved Universal Terrestrial Radio Access (E-UTRA);Physical channels and modulation(Release 12)," 3GPP TS 36.211 V12.7.0, 3rd Generation Partnership Project, Valbonne, France (Sep. 2015).
(Continued)

Primary Examiner — Dang T Ton
(74) Attorney, Agent, or Firm — Leydig, Voit & Mayer, Ltd.

(57) ABSTRACT

Embodiments of the present disclosure provide a data communication method, a terminal device, and a network device. In the solution, a terminal device receives first indication information in a first time period; and the terminal device transmits first information in a second time period, where a duration of the first time period is a first time unit, a duration of the second time period is a second time unit, and a duration of the second time unit is greater than a duration of the first time unit. In this way, although the terminal device receives the first indication information in a first time unit N, the terminal device transmits the first information in a second time unit M whose duration is greater than that of the first time unit.

17 Claims, 7 Drawing Sheets

(51) Int. Cl.
*H04W 8/24* (2009.01)
*H04W 24/10* (2009.01)
*H04W 72/12* (2009.01)

(58) Field of Classification Search
USPC ........................................................ 370/329
See application file for complete search history.

(56) References Cited

U.S. PATENT DOCUMENTS

2015/0049654 A1  2/2015  Pan et al.
2017/0164363 A1  6/2017  Zhang et al.

FOREIGN PATENT DOCUMENTS

| CN | 102047603 A | 5/2011 |
|---|---|---|
| CN | 102281646 A | 12/2011 |
| CN | 103326840 A | 9/2013 |
| CN | 104468030 A | 3/2015 |
| CN | 104660387 A | 5/2015 |
| EP | 2056616 A1 | 5/2009 |
| WO | 2009123549 A2 | 10/2009 |
| WO | 2015179146 A1 | 11/2015 |

OTHER PUBLICATIONS

"3rd Generation Partnership Project;Technical Specification Group Radio Access Network;Evolved Universal Terrestrial Radio Access (E-UTRA);Multiplexing and channel coding(Release 12)," 3GPP TS 36.212 V12.7.0, 3rd Generation Partnership Project, Valbonne, France (Dec. 2015).
"3rd Generation Partnership Project;Technical Specification Group Radio Access Network; Evolved Universal Terrestrial Radio Access (E-UTRA);Radio Resource Control (RRC);Protocol specification(Release 12)," 3GPP TS 36.331 V12.8.0, 3rd Generation Partnership Project, Valbonne, France (Dec. 2015).
"Views on TTI length", 3GPP TSG RAN WG1 Meeting #83, Anaheim, USA, R1-156459, 3rd Generation Partnership Project, Valbonne, France (Nov. 15-22, 2015).
"Control signaling enhancements for short TTI",3GPP TSG RAN WG1 Meeting #83, Anaheim, USA, R1-156461, 3rd Generation Partnership Project, Valbonne, France (Nov. 15-22, 2015).
"Evaluation methodology for TTI shortening",3GPP TSG RAN WG1 Meeting #83 R1-156922, 3rd Generation Partnership Project, Valbonne, France (Nov. 16-20, 2015).
"3rd Generation Partnership Project;Technical Specification Group Radio Access Network;Evolved Universal Terrestrial Radio Access (E-UTRA);Study on latency reduction techniques for LTE (Release 13)," 3GPP TR 36.881 V0.4.0 (Oct. 2015)(R2-155008); 3rd Generation Partnership Project, Valbonne, France (Oct. 2015).
"New SI proposal: Study on Latency reduction techniques for LTE",3GPP TSG RAN Meeting #67 RP-150465(revision of RP-150309), 3rd Generation Partnership Project, Valbonne, France (Mar. 9-12, 2015).
"3rd Generation Partnership Project;Technical Specification Group Radio Access Network;Evolved Universal Terrestrial Radio Access (E-UTRA);Physical layer procedures(Release 12)," 3GPP TS 36.213 V12.7.0, 3rd Generation Partnership Project, Valbonne, France (Sep. 2015).
"Study on Specification Impact for Downlink due to TTI Shortening", 3GPP TSG RAN WG1 Meeting #83, Anaheim, USA, R1-156819, pp. 1-5, 3rd Generation Partnership Project, Valbonne, France (Nov. 15-22, 2015).
"Study on specification impact for uplink due to TTI shortening," 3GPP TSG RAN WG1 #83, Anaheim, USA, R1-156822, XP051022510, pp. 1-3, 3rd Generation Partnership Project, Valbonne, France (Nov. 15-22, 2015).

* cited by examiner

US 10,616,887 B2

DATA COMMUNICATION METHOD, TERMINAL DEVICE, AND NETWORK DEVICE

CROSS-REFERENCE TO RELATED APPLICATIONS

This application is a continuation of International Patent Application No. PCT/CN2015/099920, filed on Dec. 30, 2015, the disclosure of which is hereby incorporated by reference in its entirety.

TECHNICAL FIELD

Embodiments of the present disclosure relate to the field of communications technologies, and in particular, to a data communication method, a terminal device, and a network device.

BACKGROUND

With fast development of wireless communications technologies, users also have higher requirements for data transmission rates. An Long Term Evolution (LTE) system can provide a high-rate data network by using a high-rate low-delay flat network architecture, so as to satisfy the increasing rate transmission requirements of the users.

In a current LTE system, a terminal device transmits information to a network device in a Transmission Time Interval (TTI) by using an uplink channel. The information generally includes data, a reference signal, Channel State Information (CSI) and the like. The CSI includes at least one of a Precoding Matrix Indicator (PMI) an Rank Indicator (RI) and a Channel Quality Indicator (CQI). The network device performs downlink scheduling on and downlink information transmission to the terminal device according to the CSI transmitted by the terminal device.

In the current LTE system, a duration of the TTI is 1 ms. To achieve a shorter round trip time and a shorter data transmission delay, a technology for shortening the TTI is put forward. However, when the TTI is shortened, the terminal device does not have sufficient uplink transmission resources for transmitting the information. Further, the network device cannot obtain the data, the reference signal, or the CSI, and therefore a downlink capacity of the system is reduced.

In conclusion, in a scenario of a short TTI, a case in which the network device cannot receive some information exists in a current method for transmitting or receiving uplink information, and further, a disadvantage that the system capacity is relatively low is caused.

SUMMARY

Embodiments of the present disclosure provide a data communication method, to resolve a disadvantage of the prior art that a system capacity is relatively low.

According to a first aspect, a data communication method is provided and includes:

receiving, by a terminal device, first indication information in a first time period, where a duration of the first time period is a first time unit, and the first indication information is used to trigger the terminal device to transmit first information in a second time period; and transmitting, by the terminal device, the first information in the second time period according to the first indication information, where a duration of the second time period is a second time unit, and a duration of the second time unit is greater than a duration of the first time unit; where an interval of K first time units exists between the second time period and the first time period, K is a positive integer, a start position of a first symbol of the second time period is the same as a start position of a first symbol of a first subframe, and the first subframe is a subframe adjacent to a subframe including the first time period, or a subframe including a first time period which has an interval of K first time units with the first time period, or a subframe adjacent to a subframe including a first time period which has an interval of K first time units with the first time period.

With reference to the first aspect, in a first possible implementation, before the transmitting, by the terminal device, the first information in the second time period according to the first indication information, the method further includes:

receiving, by the terminal device, second indication information, where the second indication information is used to trigger the terminal device to transmit second information in a third time period, a duration of the third time period is the first time unit, and at least one part or an entirety of the third time period overlaps the second time period.

With reference to the first possible implementation of the first aspect, in a second possible implementation, the method further includes:

transmitting, by the terminal device, first notification information to a network device, where the first notification information is used to notify the network device that the terminal device is capable of simultaneously transmitting information in a time period whose duration is the first time unit and a time period whose duration is the second time unit.

With reference to the first or the second possible implementation of the first aspect, in a third possible implementation, before the transmitting, by the terminal device, the first information in the second time period according to the first indication information, the method further includes:

receiving, by the terminal device, first configuration information transmitted by the network device, where the first configuration information is used to configure the terminal device to be capable of simultaneously transmitting information in a time period whose duration is the first time unit and a time period whose duration is the second time unit.

With reference to the first to the third possible implementations of the first aspect, in a fourth possible implementation, after the receiving, by the terminal device, second indication information, the method further includes:

determining, by the terminal device, whether a sum of a transmit power of a first channel carrying the first information and a transmit power of a second channel carrying the second information is less than or equal to a first threshold, where the first threshold is a maximum transmit power value allowed by the terminal device; and if the sum of the transmit power of the first channel carrying the first information and the transmit power of the second channel carrying the second information is less than or equal to the first threshold, transmitting the second information in the third time period according to the second indication information;

otherwise, stopping transmitting the second information in the third time period; or discarding the second information; or reducing the transmit power of the second channel carrying the second information, and when determining that a reduction value of the transmit power of the second channel is less than a second threshold, using a reduced transmit power of the second channel to transmit the second information.

With reference to the fourth possible implementation of the first aspect, in a fifth possible implementation, the method further includes:

if the reduction value of the transmit power of the second channel is greater than or equal to the second threshold, stopping, by the terminal device, transmitting the second information in the third time period, or discarding, by the terminal device, the second information, where the second threshold is equal to the transmit power of the second channel×T, and a value range of T is (0, 1).

With reference to the first possible implementation of the first aspect, in a sixth possible implementation, the method further includes:

transmitting, by the terminal device, second notification information to a network device, where the second notification information is used to notify the network device that the terminal device is incapable of simultaneously transmitting information in a time period whose duration is the first time unit and a time period whose duration is the second time unit.

With reference to the first or the sixth possible implementation of the first aspect, in a seventh possible implementation, before the transmitting, by the terminal device, the first information in the second time period according to the first indication information, the method further includes:

receiving, by the terminal device, second configuration information, where the second configuration information is used to configure the terminal device to be incapable of simultaneously transmitting information in a time period whose duration is the first time unit and a time period whose duration is the second time unit.

With reference to the first, the sixth, or the seventh possible implementation of the first aspect, in an eighth possible implementation, after the receiving, by a terminal device, first indication information in a first time period, the method further includes:

stopping, by the terminal device, transmitting the second information in the third time period, or discarding, by the terminal device, the second information.

With reference to the fourth to the eighth possible implementations of the first aspect, in a ninth possible implementation, after the stopping, by the terminal device, transmitting the second information in the third time period, or discarding the second information, the method further includes:

transmitting, by the terminal device, the second information in a $J^{th}$ first time period after the second time period, where J is a positive integer greater than or equal to 1.

With reference to the first aspect, or the first to the ninth possible implementations of the first aspect, in a tenth possible implementation, the receiving, by a terminal device, first indication information in a first time period includes:

receiving, by the terminal device, the first indication information in the first time period in a first carrier; and the transmitting, by the terminal device, the first information in the second time period according to the first indication information includes:

transmitting, by the terminal device, the first information in the second time period in the first carrier or a second carrier.

With reference to the first aspect, or the first to the tenth possible implementations of the first aspect, in an eleventh possible implementation, the method further includes:

transmitting, by the terminal device, third notification information to the network device, where the third notification information is used to notify the network device that the terminal device is capable of transmitting information in a time period whose duration is the second time unit and capable of receiving information in a time period whose duration is the first time unit.

With reference to the first aspect, or the first to the eleventh possible implementations of the first aspect, in a twelfth possible implementation, the method further includes:

receiving, by the terminal device, third configuration information, where the third configuration information is used to configure the terminal device to be capable of transmitting information in a time period whose duration is the second time unit and capable of receiving information in a time period whose duration is the first time unit.

With reference to the twelfth possible implementation of the first aspect, in a thirteenth possible implementation, after the receiving, by the terminal device, third configuration information, the method further includes:

receiving, by the terminal device, third information in a time period whose duration is the first time unit.

With reference to the first aspect, or the first to the thirteenth possible implementations of the first aspect, in a fourteenth possible implementation, before the transmitting, by the terminal device, the first information in the second time period according to the first indication information, the method further includes:

transmitting, by the terminal device, fourth notification information to the network device, where the fourth notification information is used to notify the network device that the terminal device is incapable of transmitting information in a plurality of uplink carriers.

With reference to the first aspect, or the first to the fourteenth possible implementations of the first aspect, in a fifteenth possible implementation, the method further includes:

receiving, by the terminal device, fourth configuration information, where the fourth configuration information is used to configure the terminal device to be capable of transmitting information in a single uplink carrier.

With reference to the first aspect, or the first to the fifteenth possible implementations of the first aspect, in a sixteenth possible implementation, the duration of the second time unit is a duration of one subframe, and the duration of the first time unit is less than or equal to a duration of one timeslot.

With reference to the first aspect, or the first to the sixteenth possible implementations of the first aspect, in a seventeenth possible implementation, the first indication information and the second indication information include a channel state information CSI reporting request and/or time unit switching information.

With reference to the seventeenth possible implementation of the first aspect, in an eighteenth possible implementation, the CSI reporting request includes at least one of CSI reporting time information, CSI type information, or frequency domain information for CSI reporting.

With reference to the seventeenth or the eighteenth possible implementation of the first aspect, in a nineteenth possible implementation, the time unit switching information includes time unit switching time information and/or time unit duration switching indication information.

According to a second aspect, a data communication method is provided and includes:

determining, by a network device, first indication information; and transmitting, by the network device, the first indication information to a terminal device in a first time period, where a duration of the first time period is a first time unit, the first indication information is used to trigger the terminal device to transmit first information in a second time period, a duration of the second time period is a second time unit, and a duration of the second time unit is greater than a duration of the first time unit; where an interval of K first time units exists between the second time period and the first time period, K is a positive integer, a start position of a first symbol of the second time period is the same as a start position of a first symbol of a first subframe, and the first subframe is a subframe adjacent to a subframe including the first time period, or a subframe including a first time period which has an interval of K first time units with the first time period, or a subframe adjacent to a subframe including a first time period which has an interval of K first time units with the first time period.

With reference to the second aspect, in a first possible implementation, after the transmitting, by the network device, the first indication information to a terminal device in a first time period, the method further includes:

receiving, by the network device, the first information transmitted by the terminal device in the second time period.

With reference to the first possible implementation of the second aspect, in a second possible implementation, before the receiving, by the network device, the first information transmitted by the terminal device, the method further includes:

transmitting, by the network device, second indication information to the terminal device, where the second indication information is used to trigger the terminal device to transmit second information in a third time period, a duration of the third time period is the first time unit, and at least one part or an entirety of the third time period overlaps the second time period; and receiving, by the network device, the second information transmitted by the terminal device in the third time period according to the second indication information, or the second information transmitted in a $J^{th}$ first time unit after the second time period, where J is a positive integer greater than or equal to 1.

With reference to the second aspect, or the first to the second possible implementations of the second aspect, in a third possible implementation, before the transmitting, by the network device, the first indication information to a terminal device in a first time period, the method further includes:

receiving, by the network device, first notification information transmitted by the terminal device, where the first notification information is used to notify the network device that the terminal device is capable of simultaneously transmitting information in a time period whose duration is the first time unit and a time period whose duration is the second time unit.

With reference to the second to the third possible implementations of the second aspect, in a fourth possible implementation, the method further includes:

transmitting, by the network device, first configuration information to the terminal device, where the first configuration information is used to configure the terminal device to be capable of simultaneously transmitting information in a time period whose duration is the first time unit and a time period whose duration is the second time unit.

With reference to the second aspect, in a fifth possible implementation, the method further includes:

receiving, by the network device, second notification information transmitted by the terminal device, where the second notification information is used to notify the network device that the terminal device is incapable of simultaneously transmitting information in a time period whose duration is the first time unit and a time period whose duration is the second time unit.

With reference to the second aspect or the fifth possible implementation of the second aspect, in a sixth possible implementation, the method further includes:

transmitting, by the network device, second configuration information to the terminal device, where the second configuration information is used to configure the terminal device to be incapable of simultaneously transmitting information in a time period whose duration is the first time unit and a time period whose duration is the second time unit.

With reference to the second aspect, or the first to the sixth possible implementations of the second aspect, in a seventh possible implementation, the transmitting, by the network device, the first indication information to a terminal device in a first time period includes:

transmitting, by the network device, the first indication information to the terminal device in the first time period in a first carrier; and the receiving, by the network device, the first information transmitted by the terminal device in the second time period includes:

receiving, by the network device, the first information in the second time period in the first carrier or a second carrier.

With reference to the second aspect, or the first to the seventh possible implementations of the second aspect, in an eighth possible implementation, the method further includes:

receiving, by the network device, third notification information transmitted by the terminal device, where the third notification information is used to notify the network device that the terminal device is capable of transmitting information in a time period whose duration is the second time unit and capable of receiving information in a time period whose duration is the first time unit.

With reference to the second aspect, or the first to the eighth possible implementations of the second aspect, in a ninth possible implementation, the method further includes:

transmitting, by the network device, third configuration information to the terminal device, where the third configuration information is used to configure the terminal device to be capable of transmitting information in a time period whose duration is the second time unit and capable of receiving information in a time period whose duration is the first time unit.

With reference to the second aspect, or the first to the ninth possible implementations of the second aspect, in a tenth possible implementation, the method further includes:

transmitting, by the network device, third information in the first time period.

With reference to the second aspect, or the first to the tenth possible implementations of the second aspect, in an eleventh possible implementation, the method further includes:

receiving, by the network device, fourth notification information transmitted by the terminal device, where the fourth notification information is used to notify the network device that the terminal device is incapable of transmitting information in a plurality of uplink carriers.

With reference to the second aspect, or the first to the eleventh possible implementations of the second aspect, in a twelfth possible implementation, the method further includes:

transmitting, by the network device, fourth configuration information to the terminal device, where the fourth configuration information is used to configure the terminal device to be capable of transmitting information in a single uplink carrier.

With reference to the second aspect, or the first to the twelfth possible implementations of the second aspect, in a thirteenth possible implementation, the method further includes:

transmitting, by the network device, at least one of first configuration information, second configuration information, or third configuration information to the terminal device, where the first configuration information is used to instruct to configure only one uplink carrier for the terminal device, the second configuration information is used to instruct to configure the terminal device to simultaneously transmit information in the second time period and the first time period, and the third configuration information is used to instruct to configure a duration of a time period for receiving information and a duration of a time period for transmitting information by the terminal device to be different.

With reference to the second aspect, or the first to the thirteenth possible implementations of the second aspect, in a fourteenth possible implementation, the duration of the second time unit is a duration of one subframe, and the duration of the first time unit is less than or equal to a duration of one timeslot.

With reference to the second aspect, or the first to the fourteenth possible implementations of the second aspect, in a fifteenth possible implementation, the first indication information and the second indication information include a channel state information CSI reporting request and/or time unit switching information.

With reference to the fifteenth possible implementation of the second aspect, in a sixteenth possible implementation, the CSI reporting request includes at least one of CSI reporting time information, CSI type information, or frequency domain information for CSI reporting.

With reference to the fifteenth or the sixteenth possible implementation of the second aspect, in a seventeenth possible implementation, the time unit switching information includes time unit switching time information and/or time unit duration switching indication information.

According to a third aspect, a terminal device is provided and includes:

a receiving unit, configured to receive first indication information in a first time period, where a duration of the first time period is a first time unit;

a processing unit, configured to trigger, according to the first indication information, a transmission unit to transmit first information in a second time period; and the transmission unit, configured to transmit the first information in the second time period, where a duration of the second time period is a second time unit, and a duration of the second time unit is greater than a duration of the first time unit; where an interval of K first time units exists between the second time period and the first time period, K is a positive integer, a start position of a first symbol of the second time period is the same as a start position of a first symbol of a first subframe, and the first subframe is a subframe adjacent to a subframe including the first time period, or a subframe including a first time period which has an interval of K first time units with the first time period, or a subframe adjacent to a subframe including a first time period which has an interval of K first time units with the first time period.

With reference to the third aspect, in a first possible implementation, the receiving unit is further configured to receive second indication information; and the processing unit is further configured to trigger the transmission unit to transmit second information in a third time period, where a duration of the third time period is the first time unit, and at least one part or an entirety of the third time period overlaps the second time period.

With reference to the first possible implementation of the third aspect, in a second possible implementation, the transmission unit is further configured to:

transmit first notification information to a network device, where the first notification information is used to notify the network device that the terminal device is capable of simultaneously transmitting information in a time period whose duration is the first time unit and a time period whose duration is the second time unit.

With reference to the first or the second possible implementation of the third aspect, in a third possible implementation, the receiving unit is further configured to receive first configuration information transmitted by the network device; and the processing unit is further configured to configure, according to the first configuration information, the terminal device to be capable of simultaneously transmitting information in a time period whose duration is the first time unit and a time period whose duration is the second time unit.

With reference to the first to the third possible implementations of the third aspect, in a fourth possible implementation, the processing unit is further configured to determine whether a sum of a transmit power of a first channel carrying the first information and a transmit power of a second channel carrying the second information is less than or equal to a first threshold, where the first threshold is a maximum transmit power value allowed by the terminal device;

the transmission unit is further configured to transmit the second information in the third time period according to the second indication information when the processing unit determines that the sum of the transmit power of the first channel carrying the first information and the transmit power of the second channel carrying the second information is less than or equal to the first threshold; and the processing unit is further configured to: when the processing unit determines that the sum of the transmit power of the first channel carrying the first information and the transmit power of the second channel carrying the second information is greater than the first threshold, stop transmitting the second information in the third time period; or discard the second information; or reduce the transmit power of the second channel carrying the second information, and when determining that a reduction value of the transmit power of the second channel is less than a second threshold, use a reduced transmit power of the second channel to transmit the second information.

With reference to the fourth possible implementation of the third aspect, in a fifth possible implementation, the processing unit is further configured to:

if the reduction value of the transmit power of the second channel is greater than or equal to the second threshold, stop transmitting the second information in the third time period, or discard the second information, where the second threshold is equal to the transmit power of the second channel×T, and a value range of T is (0, 1).

With reference to the first possible implementation of the third aspect, in a sixth possible implementation, the transmission unit is further configured to:

transmit second notification information to a network device, where the second notification information is used to notify the network device that the terminal device is incapable of simultaneously transmitting information in a time period whose duration is the first time unit and a time period whose duration is the second time unit.

With reference to the first or the sixth possible implementation of the third aspect, in a seventh possible implementation, the receiving unit is further configured to receive second configuration information; and the processing unit is further configured to configure, according to the second configuration information, the terminal device to be incapable of simultaneously transmitting information in a time period whose duration is the first time unit and a time period whose duration is the second time unit.

With reference to the first, the sixth, or the seventh possible implementation of the third aspect, in an eighth possible implementation, the transmission unit is further configured to stop transmitting the second information in the third time period, or discard the second information.

With reference to the fourth to the eighth possible implementations of the third aspect, in a ninth possible implementation, the transmission unit is further configured to:

transmit the second information in a $J^{th}$ first time period after the second time period, where J is a positive integer greater than or equal to 1.

With reference to the third aspect, or the first to the ninth possible implementations of the third aspect, in a tenth possible implementation, the receiving unit is specifically configured to:

receive the first indication information in the first time period in a first carrier; and the transmission unit is specifically configured to:

transmit the first information in the second time period in the first carrier or a second carrier.

With reference to the third aspect, or the first to the tenth possible implementations of the third aspect, in an eleventh possible implementation, the transmission unit is further configured to:

transmit third notification information to the network device, where the third notification information is used to notify the network device that the terminal device is capable of transmitting information in a time period whose duration is the second time unit and capable of receiving information in a time period whose duration is the first time unit.

With reference to the third aspect, or the first to the eleventh possible implementations of the third aspect, in a twelfth possible implementation, the receiving unit is further configured to receive third configuration information; and the processing unit is further configured to configure, according to the third configuration information, the terminal device to be capable of transmitting information in a time period whose duration is the second time unit and capable of receiving information in a time period whose duration is the first time unit.

With reference to the twelfth possible implementation of the third aspect, in a thirteenth possible implementation, the receiving unit is further configured to:

receive third information in a time period whose duration is the first time unit.

With reference to the third aspect, or the first to the thirteenth possible implementations of the third aspect, in a fourteenth possible implementation, the transmission unit is further configured to:

transmit fourth notification information to the network device, where the fourth notification information is used to notify the network device that the terminal device is incapable of transmitting information in a plurality of uplink carriers.

With reference to the third aspect, or the first to the fourteenth possible implementations of the third aspect, in a fifteenth possible implementation, the receiving unit is further configured to receive fourth configuration information; and the processing unit is further configured to configure, according to the fourth configuration information, the terminal device to be capable of transmitting information in a single uplink carrier.

With reference to the third aspect, or the first to the fifteenth possible implementations of the third aspect, in a sixteenth possible implementation, the duration of the second time unit is a duration of one subframe, and the duration of the first time unit is less than or equal to a duration of one timeslot.

With reference to the third aspect, or the first to the sixteenth possible implementations of the third aspect, in a seventeenth possible implementation, the first indication information and the second indication information include a channel state information CSI reporting request and/or time unit switching information.

With reference to the seventeenth possible implementation of the third aspect, in an eighteenth possible implementation, the CSI reporting request includes at least one of CSI reporting time information, CSI type information, or frequency domain information for CSI reporting.

With reference to the seventeenth or the eighteenth possible implementation of the third aspect, in a nineteenth possible implementation, the time unit switching information includes time unit switching time information and/or time unit duration switching indication information.

According to a fourth aspect, a network device is provided and includes:

a processing unit, configured to determine first indication information; and a transmission unit, configured to transmit the first indication information to a terminal device in a first time period, where a duration of the first time period is a first time unit, the first indication information is used to trigger the terminal device to transmit first information in a second time period, a duration of the second time period is a second time unit, and a duration of the second time unit is greater than a duration of the first time unit; where an interval of K first time units exists between the second time period and the first time period, K is a positive integer, a start position of a first symbol of the second time period is the same as a start position of a first symbol of a first subframe, and the first subframe is a subframe adjacent to a subframe including the first time period, or a subframe including a first time period which has an interval of K first time units with the first time period, or a subframe adjacent to a subframe including a first time period which has an interval of K first time units with the first time period.

With reference to the fourth aspect, in a first possible implementation, the network device further includes a receiving unit, configured to receive the first information transmitted by the terminal device in the second time period.

With reference to the first possible implementation of the fourth aspect, in a second possible implementation, the transmission unit is further configured to:

transmit second indication information to the terminal device, where the second indication information is used to trigger the terminal device to transmit second information in a third time period, a duration of the third time period is the first time unit, and at least one part or an entirety of the third time period overlaps the second time period; and the receiving unit is further configured to:

receive the second information transmitted by the terminal device in the third time period according to the second indication information, or the second information transmitted in a $J^{th}$ first time unit after the second time period, where J is a positive integer greater than or equal to 1.

With reference to the fourth aspect, or the first to the second possible implementations of the fourth aspect, in a third possible implementation, the network device further includes the receiving unit, configured to receive first notification information transmitted by the terminal device; and the processing unit is further configured to determine, according to the first notification information, that the terminal device is capable of simultaneously transmitting information in a time period whose duration is the first time unit and a time period whose duration is the second time unit.

With reference to the second to the third possible implementations of the fourth aspect, in a fourth possible implementation, the transmission unit is further configured to:

transmit first configuration information to the terminal device, where the first configuration information is used to configure the terminal device to be capable of simultaneously transmitting information in a time period whose duration is the first time unit and a time period whose duration is the second time unit.

With reference to the fourth aspect, in a fifth possible implementation, the network device further includes a receiving unit, configured to receive second notification information transmitted by the terminal device; and the processing unit is further configured to determine, according to the second notification information, that the terminal device is incapable of simultaneously transmitting information in a time period whose duration is the first time unit and a time period whose duration is the second time unit.

With reference to the fourth aspect or the fifth possible implementation of the fourth aspect, in a sixth possible implementation, the transmission unit is further configured to:

transmit second configuration information to the terminal device, where the second configuration information is used to configure the terminal device to be incapable of simultaneously transmitting information in a time period whose duration is the first time unit and a time period whose duration is the second time unit.

With reference to the fourth aspect, or the first to the sixth possible implementations of the fourth aspect, in a seventh possible implementation, the transmission unit is specifically configured to:

transmit the first indication information to the terminal device in the first time period in a first carrier; and the network device further includes the receiving unit, configured to receive the first information in the second time period in the first carrier or a second carrier.

With reference to the fourth aspect, or the first to the seventh possible implementations of the fourth aspect, in an eighth possible implementation, the network device further includes the receiving unit, configured to receive third notification information transmitted by the terminal device; and the processing unit is further configured to determine, according to the third notification information, that the terminal device is capable of transmitting information in a time period whose duration is the second time unit and capable of receiving information in a time period whose duration is the first time unit.

With reference to the fourth aspect, or the first to the eighth possible implementations of the fourth aspect, in a ninth possible implementation, the transmission unit is further configured to:

transmit third configuration information to the terminal device, where the third configuration information is used to configure the terminal device to be capable of transmitting information in a time period whose duration is the second time unit and capable of receiving information in a time period whose duration is the first time unit.

With reference to the fourth aspect, or the first to the ninth possible implementations of the fourth aspect, in a tenth possible implementation, the transmission unit is further configured to:

transmit third information in the first time period.

With reference to the fourth aspect, or the first to the tenth possible implementations of the fourth aspect, in an eleventh possible implementation, the network device further includes the receiving unit, configured to receive fourth notification information transmitted by the terminal device; and the processing unit is further configured to determine, according to the fourth notification information, that the terminal device is incapable of transmitting information in a plurality of uplink carriers.

With reference to the fourth aspect, or the first to the eleventh possible implementations of the fourth aspect, in a twelfth possible implementation, the transmission unit is further configured to:

transmit fourth configuration information to the terminal device, where the fourth configuration information is used to configure the terminal device to be capable of transmitting information in a single uplink carrier.

With reference to the fourth aspect, or the first to the twelfth possible implementations of the fourth aspect, in a thirteenth possible implementation, the transmission unit is further configured to:

transmit at least one of first configuration information, second configuration information, or third configuration information to the terminal device, where the first configuration information is used to instruct to configure only one uplink carrier for the terminal device, the second configuration information is used to instruct to configure the terminal device to simultaneously transmit information in the second time period and the first time period, and the third configuration information is used to instruct to configure a duration of a time period for receiving information and a duration of a time period for transmitting information by the terminal device to be different.

With reference to the fourth aspect, or the first to the thirteenth possible implementations of the fourth aspect, in a fourteenth possible implementation, the duration of the second time unit is a duration of one subframe, and the duration of the first time unit is less than or equal to a duration of one timeslot.

With reference to the fourth aspect, or the first to the fourteenth possible implementations of the fourth aspect, in a fifteenth possible implementation, the first indication information and the second indication information include a channel state information CSI reporting request and/or time unit switching information.

With reference to the fifteenth possible implementation of the fourth aspect, in a sixteenth possible implementation, the CSI reporting request includes at least one of CSI reporting time information, CSI type information, or frequency domain information for CSI reporting.

With reference to the fifteenth or the sixteenth possible implementation of the fourth aspect, in a seventeenth possible implementation, the time unit switching information includes time unit switching time information and/or time unit duration switching indication information.

According to a fifth aspect, a terminal device is provided and includes:

a receiver, configured to receive first indication information in a first time period, where a duration of the first time period is a first time unit;

a processor, configured to trigger, according to the first indication information, a transmitter to transmit first information in a second time period; and the transmitter, configured to transmit the first information in the second time period, where a duration of the second time period is a second time unit, and a duration of the second time unit is greater than a duration of the first time unit; where an interval of K first time units exists between the second time period and the first time period, K is a positive integer, a start position of a first symbol of the second time period is the same as a start position of a first symbol of a first subframe, and the first subframe is a subframe adjacent to a subframe including the first time period, or a subframe including a first time period which has an interval of K first time units with the first time period, or a subframe adjacent to a subframe including a first time period which has an interval of K first time units with the first time period.

According to a sixth aspect, a network device is provided and includes:

a processor, configured to determine first indication information; and a transmitter, configured to transmit the first indication information to a terminal device in a first time period, where a duration of the first time period is a first time unit, the first indication information is used to trigger the terminal device to transmit first information in a second time period, a duration of the second time period is a second time unit, and a duration of the second time unit is greater than a duration of the first time unit; where an interval of K first time units exists between the second time period and the first time period, K is a positive integer, a start position of a first symbol of the second time period is the same as a start position of a first symbol of a first subframe, and the first subframe is a subframe adjacent to a subframe including the first time period, or a subframe including a first time period that is separated from the first time period by an interval of K first time units, or a subframe adjacent to a subframe including a first time period that is separated from the first time period by an interval of K first time units. In the foregoing technical solutions, a terminal device receives first indication information in a first time period; and the terminal device transmits first information in a second time period, where a duration of the first time period is a first time unit, a duration of the second time period is a second time unit, and a duration of the second time unit is greater than a duration of the first time unit. In this way, although the terminal device receives the first indication information in a first time unit N, the terminal device transmits the first information in a second time unit M whose duration is greater than that of the first time unit. Therefore, a disadvantage that a system capacity is reduced due to lack of uplink transmission resources for transmitting the first information by the terminal device is avoided.

DESCRIPTION OF EMBODIMENTS

To make the objectives, technical solutions, and advantages of the present disclosure clearer, the following further describes the present disclosure in detail with reference to the accompanying drawings. Apparently, the described embodiments are merely a part rather than all of the embodiments of the present disclosure. All other embodiments obtained by persons of ordinary skill in the art based on the embodiments of the present disclosure without creative efforts shall fall within the protection scope of the present disclosure.

To make the present disclosure more comprehensible, the following describes the application field and basic technologies to which the present disclosure is applicable.

The technical solutions of the embodiments of the present disclosure may be applied to various communications systems, such as a Global System for Mobile Communication (GSM), a Code Division Multiple Access (CDMA) system, a Wideband Code Division Multiple Access (WCDMA) system, a General Packet Radio Service (GPRS), and a Long Term Evolution (LTE) system.

A terminal device may also be referred to as a mobile terminal, a mobile terminal device, or the like, and this is not specifically limited herein. The terminal device may communicate with one or more core network devices through a radio access network (for example, a Radio Access Network (RAN)). The terminal device may be a mobile terminal, such as a mobile phone (also referred to as a "cellular" phone) and a computer with a mobile terminal. For example, the terminal device may be a portable, pocket-sized, handheld, computer built-in, or in-vehicle mobile apparatus, and the terminal device exchanges voices and/or data with the radio access network.

A network device may be a base transceiver station (BTS) in GSM or CDMA, or may be a NodeB in WCDMA, or may be an evolved NodeB (eNB, or e-NodeB) in LTE. This is not specifically limited in the embodiments of the present disclosure.

Figure 1A:
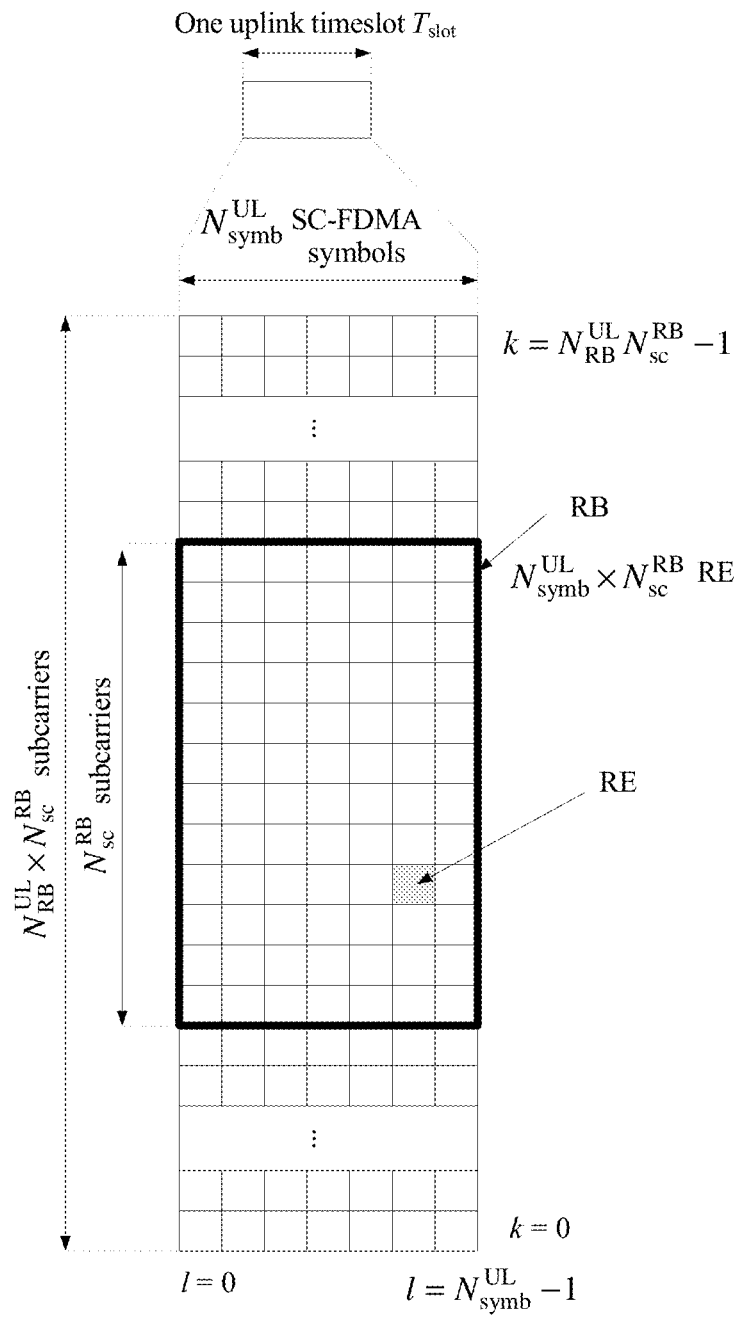
FIG. 1A is a schematic diagram of a resource format in a slot according to an embodiment of the present disclosure.

A TTI of 1 ms is a subframe in a time domain, and one subframe includes two timeslots (slot). Each slot includes six or seven symbols (symbol). A resource format in a slot is shown in FIG. 1A. One Resource Block (RB) (or Physical Resource Block (PRB)) includes 12 subcarriers in a frequency domain×6 or 7 symbols in the time domain. When a Cyclic Prefix (CP) is a normal CP, an RB occupies seven symbols in the time domain. When a CP is an extended CP, an RB occupies six symbols in the time domain. One Resource Element (RE) includes 1 subcarrier in the frequency domain×1 symbol in the time domain. One PRB pair includes two PRBs, in two slots in a subframe.

Figure 1B:
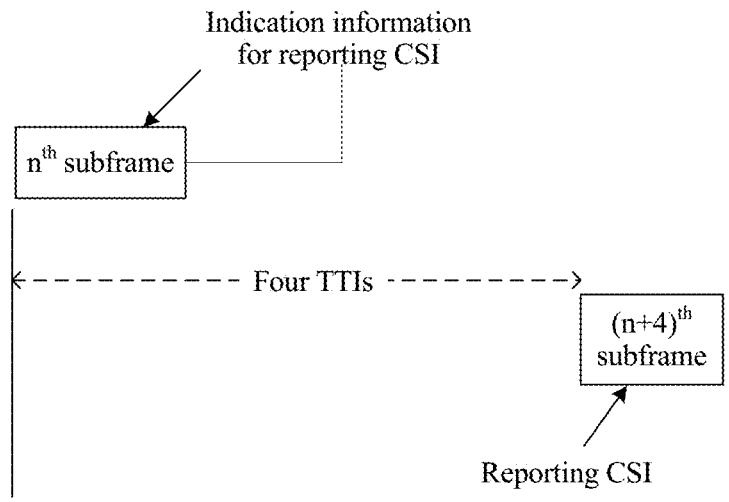
FIG. 1B is a schematic diagram of a time sequence of scheduling uplink information in an FDD system according to an embodiment of the present disclosure.

In the embodiments of the present disclosure, when the TTI is of 1 ms, the terminal device receives, in an $n^{th}$ subframe, indication information about uplink information, such as indication information for reporting CSI. Then the terminal device transmits the uplink information in an $(n+k)^{th}$ subframe. Optionally, k may be 4. When k is 4, a time sequence relationship is shown in FIG. 1B.

Figure 1C:
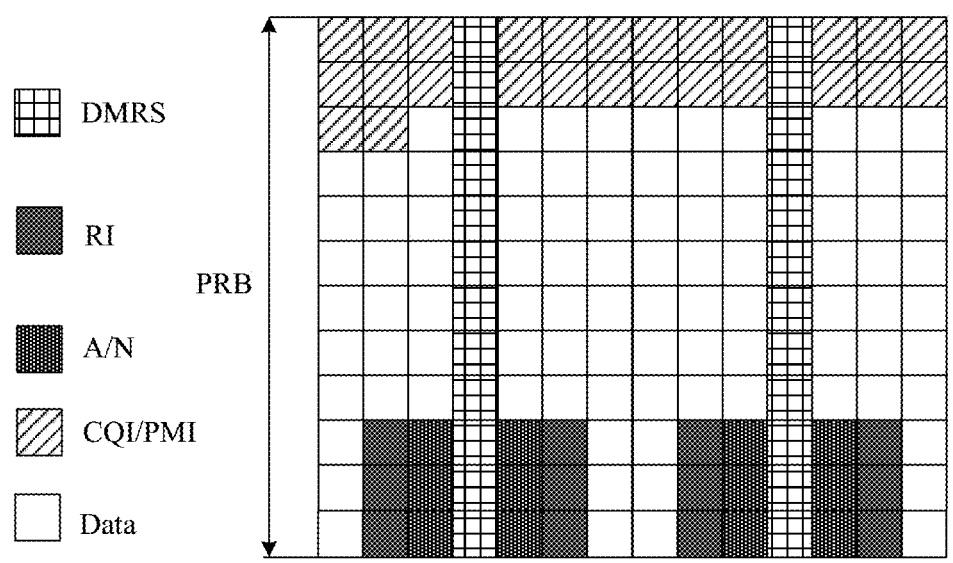
FIG. 1C is a schematic diagram of a PUSCH in a subframe according to an embodiment of the present disclosure.

In the prior art, when the TTI is of 1 ms, the CSI includes periodic CSI and aperiodic CSI. The periodic CSI is CSI periodically transmitted by the terminal device. The aperiodic CSI is CSI that is transmitted by the terminal device in a corresponding TTI after the network device notifies the terminal device by using CSI indication information in Downlink Control Information (DCI). The aperiodic CSI is transmitted only on a Physical Uplink Shared Channel (PUSCH). Assuming that only one PRB pair in a subframe is allocated to the terminal device, a PUSCH format is shown in FIG. 1C. Distribution of CSI on a PUSCH can be seen from FIG. 1C. The periodic CSI may be transmitted on the PUSCH, or may be transmitted on a Physical Uplink Control Channel (PUSCH). That is, if the PUSCH is transmitted in a subframe including the current TTI, the periodic CSI may be transmitted on the PUSCH or the PUCCH; or if the PUSCH is not transmitted in a subframe including the current TTI, the periodic CSI can be transmitted only on the PUCCH. In the prior art, if the periodic CSI and the aperiodic CSI collide in a subframe, the terminal device transmits only the aperiodic CSI in the subframe.

The term "plurality" denotes two or more. The term "and/or" describes an association relationship between associated objects and represents that three relationships may exist. For example, A and/or B may represent the following three cases: Only A exists, both A and B exist, and only B exists. The character "/" generally indicates an "or" relationship between the associated objects.

The following describes the embodiments of the present disclosure in detail with reference to the accompanying drawings.

Figure 2A:
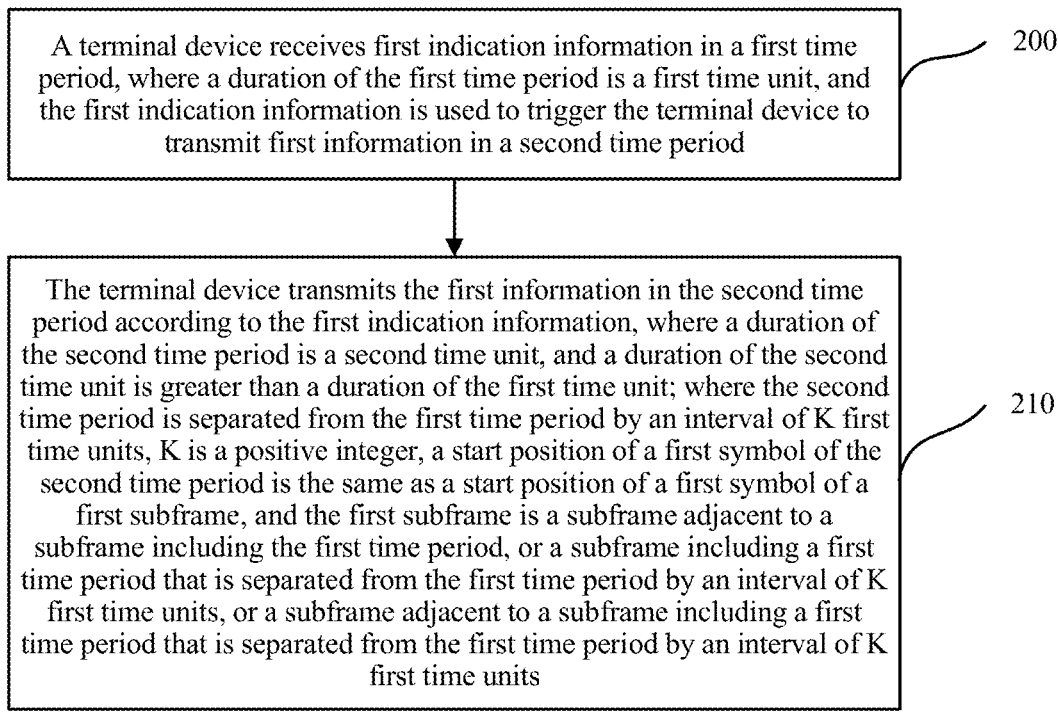
FIG. 2A is a flowchart of data communication method according to an embodiment of the present disclosure.

Referring to FIG. 2A, in an embodiment of the present disclosure, a procedure of data communication method is as follows:

Step 200: A terminal device receives first indication information in a first time period, where a duration of the first time period is a first time unit, and the first indication information is used to trigger the terminal device to transmit first information in a second time period.

Step 210: The terminal device transmits the first information in the second time period according to the first indication information, where a duration of the second time period is a second time unit, and a duration of the second time unit is greater than a duration of the first time unit.

An interval of K first time units exists between the second time period and the first time period, K is a positive integer, a start position of a first symbol of the second time period is the same as a start position of a first symbol of a first subframe, and the first subframe is a subframe adjacent to a subframe including the first time period, or a subframe including a first time period which has an interval of K first time units with the first time period, or a subframe adjacent to a subframe including a first time period which has an interval of K first time units with the first time period.

Figure 2B:
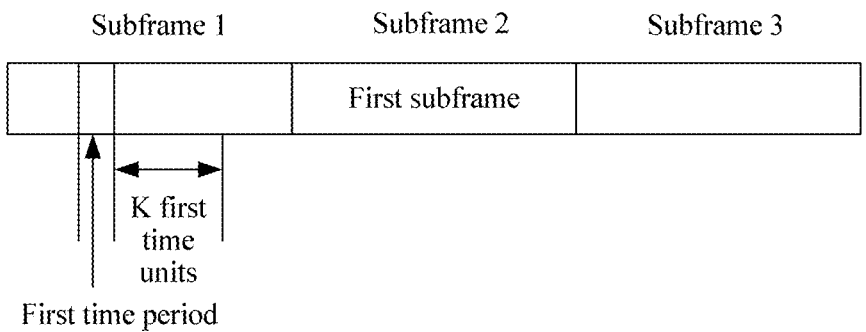
FIG. 2B is a schematic diagram of a first subframe according to an embodiment of the present disclosure.

When the first subframe is the subframe adjacent to the subframe including the first time period, a subframe 2 is the first subframe, as shown in FIG. 2B.

Figure 2C:
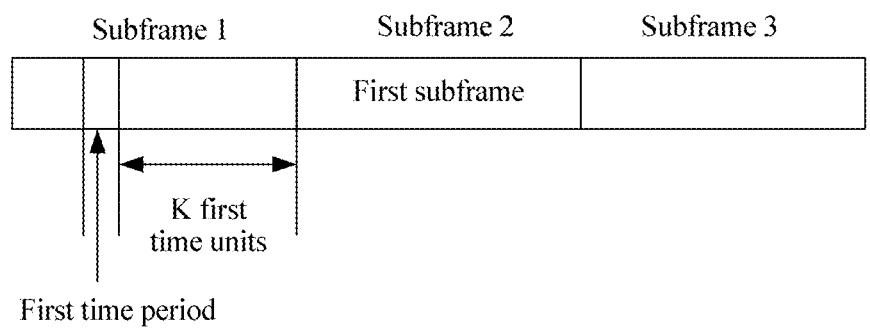
FIG. 2C is another schematic diagram of a first subframe according to an embodiment of the present disclosure.
Figure 2D:
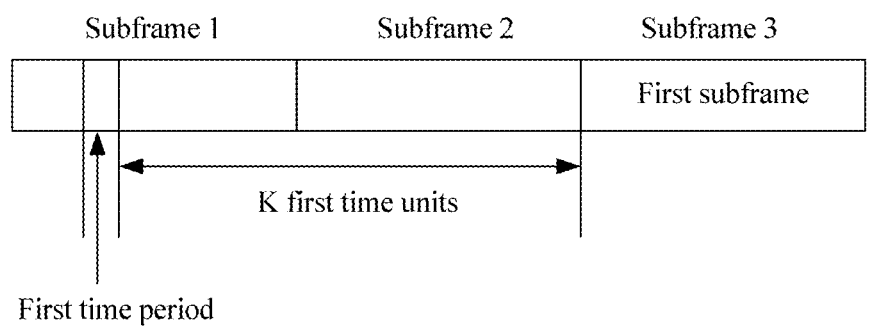
FIG. 2D is another schematic diagram of a first subframe according to an embodiment of the present disclosure.

When the first subframe is the subframe including the first time period that is separated from the first time period by an interval of K first time units, a subframe 2 is the first subframe, as shown in FIG. 2C; or a subframe 3 is the first subframe, as shown in FIG. 2D.

Figure 2E:
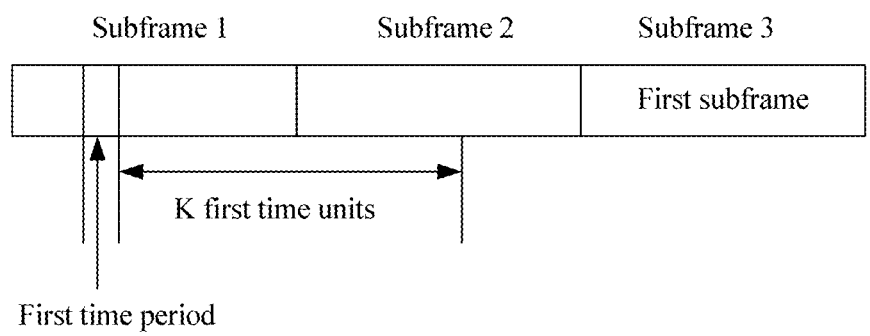
FIG. 2E is another schematic diagram of a first subframe according to an embodiment of the present disclosure.

When the first subframe is the subframe adjacent to the subframe including the first time period that is separated from the first time period by an interval of K first time units, a subframe 2 is the first subframe, as shown in FIG. 2B; or a subframe 3 is the first subframe, as shown in FIG. 2E.

Certainly, the first subframe is not limited to the foregoing several forms, and may have other forms. Details are not described exhaustively herein.

In this embodiment of the present disclosure, optionally, K is 4.

In this embodiment of the present disclosure, before the terminal device transmits the first information in the second time period according to the first indication information, the method further includes:

the terminal device receives second indication information, where the second indication information is used to trigger the terminal device to transmit second information in a third time period, a duration of the third time period is the first time unit, and at least one part or an entirety of the third time period overlaps the second time period.

It should be noted that, that at least one part or an entirety of the third time period overlaps the second time period indicates that the third time period overlaps the second time period in a time domain, or certainly may indicate other meanings. Details are not described exhaustively herein.

Further, the terminal device transmits first notification information to a network device, where the first notification information is used to notify the network device that the terminal device is capable of simultaneously transmitting information in a time period whose duration is the first time unit and a time period whose duration is the second time unit.

It should be noted that, a time sequence of receiving the first indication information and transmitting the first notification information is not limited. The first indication information may be received first and then the first notification information is transmitted, or the first notification information may be transmitted first and then the first indication information is received. A preferred solution is first transmitting the first notification information and then receiving the first indication information.

Before the terminal device transmits the first information in the second time period according to the first indication information, the method further includes:

the terminal device receives first configuration information transmitted by the network device, where the first configuration information is used to configure the terminal device to be capable of simultaneously transmitting information in a time period whose duration is the first time unit and a time period whose duration is the second time unit.

It should be noted that, receiving the first configuration information may be receiving the first configuration information on a basis of transmitting the first notification information or without transmitting the first notification information.

After the terminal device receives the second indication information, the method further includes:

the terminal device determines whether a sum of a transmit power of a first channel carrying the first information and a transmit power of a second channel carrying the second information is less than or equal to a first threshold, where the first threshold is a maximum transmit power value allowed by the terminal device; and if yes, the terminal device transmits the second information in the third time period according to the second indication information;

otherwise, the terminal device stops transmitting the second information in the third time period; or the terminal device discards the second information; or the terminal device reduces the transmit power of the second channel carrying the second information, and when determining that a reduction value of the transmit power of the second channel is less than a second threshold, uses a reduced transmit power of the second channel to transmit the second information.

It should be noted that, herein the first channel or the second channel may be an uplink physical channel or an uplink signal, for example, a Physical Uplink Control Channel (PUCCH), a Physical Uplink Shared Channel (PUSCH), or an Sounding Reference Signal (SRS).

It should be noted that, "the terminal device is capable of simultaneously transmitting information in a time period whose duration is the first time unit and a time period whose duration is the second time unit" may be understood as "when the time period whose duration is the first time unit overlaps the time period whose duration is the second time unit, the terminal device is capable of simultaneously transmitting information in the second time unit and the first time unit"; and "the terminal device is configured to simultaneously transmit information in a time period whose duration is the first time unit and a time period whose duration is the second time unit" may be understood as "when the time period whose duration is the first time unit overlaps the time period whose duration is the second time unit, the terminal device is configured by the network device and allowed to simultaneously transmit information in the time period whose duration is the first time unit and the time period whose duration is the second time unit".

In this embodiment of the present disclosure, optionally, the reduced transmit power of the second channel is less than or equal to a difference between the first threshold and the transmit power of the first channel.

In this embodiment of the present disclosure, optionally, if the reduction value of the transmit power of the second channel is greater than or equal to the second threshold, the terminal device stops transmitting the second information in the third time period, or the terminal device discards the second information, where the second threshold may be the transmit power of the second channel×T, and a value range of T is (0, 1), and 0<T≤1. Optionally, T=0.75.

The terminal device transmits second notification information to a network device, where the second notification information is used to notify the network device that the terminal device is incapable of simultaneously transmitting information in a time period whose duration is the first time unit and a time period whose duration is the second time unit.

Before the terminal device transmits the first information in the second time period according to the first indication information, the method further includes:

the terminal device receives second configuration information, where the second configuration information is used to configure the terminal device to be incapable of simultaneously transmitting information in a time period whose duration is the first time unit and a time period whose duration is the second time unit.

It should be noted that, receiving the second configuration information may be receiving the second configuration information on a basis of transmitting the second notification information or without transmitting the second notification information.

After the terminal device receives the first indication information in the first time period, the method further includes:

the terminal device stops transmitting the second information in the third time period, or the terminal device discards the second information.

It should be noted that, that the terminal device stops transmitting the second information or discards the second information may be that the terminal device stops transmitting the second information in the third time period or discards the second information. To successfully transmit the second information, in this embodiment of the present disclosure, after the terminal device stops transmitting the second information in the third time period, or discards the second information, the method further includes:

the terminal device transmits the second information in a $J^{th}$ first time period after the second time period, where J is a positive integer greater than or equal to 1.

In this embodiment of the present disclosure, carriers for receiving the first indication information and transmitting the first information by the terminal device may be a same carrier, or may be different carriers. Therefore, in this embodiment of the present disclosure, optionally, the terminal device may receive the first indication information in the first time period in the following manner:

the terminal device receives the first indication information in the first time period in a first carrier; and that the terminal device transmits the first information in the second time period according to the first indication information includes:

the terminal device transmits the first information in the second time period in the first carrier or a second carrier.

Optionally, when a communications system is Frequency Division Duplex (FDD) system, carriers for receiving the first indication information and transmitting the first information by the terminal device may be different carriers; or when a communications system is Time Division Duplex (TDD) system, carriers for receiving the first indication information and transmitting the first information by the terminal device may be a same carrier.

The terminal device transmits third notification information to the network device, where the third notification information is used to notify the network device that the terminal device is capable of transmitting information in a time period whose duration is the second time unit and capable of receiving information in a time period whose duration is the first time unit.

The method further includes:

the terminal device receives third configuration information, where the third configuration information is used to configure the terminal device to be capable of transmitting information in a time period whose duration is the second time unit and capable of receiving information in a time period whose duration is the first time unit.

It should be noted that, receiving the third configuration information may be receiving the third configuration information on a basis of transmitting the third notification information or without transmitting the third notification information.

After the terminal device receives the third configuration information, the method further includes:

the terminal device receives third information in a time period whose duration is the first time unit.

Before the terminal device transmits the first information in the second time period according to the first indication information, the method further includes:

the terminal device transmits fourth notification information to the network device, where the fourth notification information is used to notify the network device that the terminal device is incapable of transmitting information in a plurality of uplink carriers.

The method further includes:

the terminal device receives fourth configuration information, where the fourth configuration information is used to configure the terminal device to be capable of transmitting information in a single uplink carrier.

It should be noted that, receiving the fourth configuration information may be receiving the fourth configuration information on a basis of transmitting the fourth notification information or without transmitting the fourth notification information.

"The terminal device is incapable of performing transmission in a plurality of uplink carriers" may be understood as "the terminal device is capable of performing transmission only in a single uplink carrier", that is, the terminal device is capable of transmitting information only in a single uplink carrier.

"The terminal device is not configured with more than one uplink carrier" may be understood as "the terminal device is configured with only one uplink carrier".

It should be noted that, "the terminal device is not configured with more than one uplink carrier" may also be described as "the terminal device is not configured with more than one serving cell"; and "the terminal device is capable of performing transmission only in a single uplink carrier" may also be described as "the terminal device is capable of transmitting information in only one serving cell".

A case in which the terminal device may transmit the first information in a second time unit M is described above. In an actual application, the following case may also be included. If the terminal device is capable of performing transmission in a plurality of uplink carriers and/or is configured with more than one uplink carrier, the terminal device does not transmit the first information.

In this embodiment of the present disclosure, a channel carrying the first indication information may be at least one of a Physical Downlink Control Channel (PDCCH), a Physical Hybrid ARQ Indicator Channel (PHICH, physical HARQ indicator channel, Hybrid Automatic Repeat request (HARQ)), or an Enhanced Physical Downlink Control Channel (EPDCCH).

Likewise, a channel carrying the second indication information may be at least one of the PDCCH, the PHICH, or the EPDCCH.

In this embodiment of the present disclosure, optionally, the duration of the second time unit may be a duration of one subframe, and the duration of the first time unit is less than or equal to a duration of one timeslot.

Alternatively, the duration of the second time unit may be a duration of one timeslot, and the duration of the first time unit is less than a duration of one timeslot, for example, may be a duration of t SC-FDMA symbols or t OFDM symbols, where t is a positive integer less than or equal to 7. For example, a first duration is one SC-FDMA symbol, two SC-FDMA symbols, three SC-FDMA symbols, four SC-FDMA symbols, five SC-FDMA symbols, six SC-FDMA symbols, seven SC-FDMA symbols, one OFDM symbol, two OFDM symbols, three OFDM symbols, four OFDM symbols, five OFDM symbols, six OFDM symbols, or seven OFDM symbols. For another example, a first duration may be 0.5 ms, 0.125 ms, or 0.1 ms. It should be noted that, for a communications system in which a subcarrier spacing is 15 kHz, a duration of one timeslot is 0.5 ms, and a duration of one subframe is 1 ms. For a communications system in which a subcarrier spacing is greater than 15 kHz, a duration of one timeslot may be a time unit less than 0.5 ms, and a duration of one subframe may be a time unit less than 1 ms. Herein the duration of the timeslot and the duration of the subframe are not specifically limited.

In this embodiment of the present disclosure, optionally, both the first indication information and the second indication information include a CSI reporting request and/or time unit switching information.

In this embodiment of the present disclosure, optionally, the CSI reporting request includes at least one of CSI reporting time information, CSI type information, or frequency domain information for CSI reporting.

In this embodiment of the present disclosure, optionally, the CSI type information indicates whether CSI is periodic CSI or aperiodic In this embodiment of the present disclosure, optionally, the frequency domain information for CSI reporting includes at least one of subband information, subband group information, carrier information, or carrier group information.

For example, if the frequency domain information includes the subband information, the terminal device transmits the first information according to the subband information, and the first information includes CSI of a subband; if the frequency domain information includes the subband group information, the terminal device transmits the first information according to the subband group information, and the first information includes CSI of each subband in a subband group; if the frequency domain information includes the carrier information, the terminal device transmits the first information according to the carrier information, and the first information includes CSI of a carrier; or if the frequency domain information includes the carrier group information, the terminal device transmits the first information according to the carrier group information, and the first information includes CSI of each carrier in a carrier group.

In this embodiment of the present disclosure, optionally, the time unit switching information includes time unit switching time information and/or time unit duration switching indication information.

The time unit duration switching indication information includes at least one of indication information about a first time unit, indication information about a second time unit, indication information about a long TTI, indication information about a short TTI, subframe indication information, timeslot indication information, or symbol indication information.

The time unit switching time information includes at least one of a time of switching from a first time unit to a second time unit, a time of switching from a second time unit to a first time unit, a quantity of first time units traversed during switching from a first time unit to a second time unit, a minimum quantity of first time units traversed during switching from a first time unit to a second time unit, a maximum quantity of first time units traversed during switching from a first time unit to a second time unit, a quantity of second time units traversed during switching from a second time unit to a first time unit, a minimum quantity of second time units traversed during switching from a second time unit to a first time unit, or a maximum quantity of second time units traversed during switching from a second time unit to a first time unit.

In this embodiment of the present disclosure, "the terminal device is capable of simultaneously transmitting information in a time period whose duration is the first time unit and a time period whose duration is the second time unit" may also be described as "the terminal device supports a function of being capable of simultaneously transmitting information in a time period whose duration is the first time unit and a time period whose duration is the second time unit".

Terms "more than one" and "at least two" described in this embodiment of the present disclosure have a same meaning, and may replace each other in use. This is not specifically limited herein.

It should be noted that, in this embodiment of the present disclosure, whether the terminal device is configured to perform some operations or have some capabilities may be determined according to received configuration information transmitted by the network device. Therefore, further, the terminal device receives at least one of first configuration information, second configuration information, or third configuration information transmitted by the network device. The first configuration information is used to configure only one uplink carrier for the terminal device. Further, the first configuration information may be further used to instruct to configure more than one uplink carrier for the terminal device. The second configuration information is used to indicate that the terminal device is configured to be capable of simultaneously transmitting information in a time period whose duration is the first time unit and a time period whose duration is the second time unit. Further, the second configuration information is further used to indicate that the terminal device is not configured to be capable of simultaneously transmitting information in a time period whose duration is the first time unit and a time period whose duration is the second time unit. The third configuration information is used to instruct to configure a duration of a time period for receiving information and a duration of a time period for transmitting information by the terminal device to be different. Further, the third configuration information is further used to instruct to configure a duration of a time period for receiving information and a duration of a time period for transmitting information by the terminal device to be the same.

For example, that the terminal device is configured to be capable of simultaneously transmitting information in a time period whose duration is the first time unit and a time period whose duration is the second time unit may be: the terminal device receives the second configuration information transmitted by the network device, and the terminal device determines, according to the second configuration information, that the terminal device is configured to be capable of simultaneously transmitting information in a time period whose duration is the first time unit and a time period whose duration is the second time unit.

For another example, that the terminal device is not configured to be capable of simultaneously transmitting information in a time period whose duration is the first time unit and a time period whose duration is the second time unit may be that the terminal device has not received the second configuration information transmitted by the network device.

For another example, that the terminal device configures a duration of a time period for receiving information and a duration of a time period for transmitting information by the terminal device to be different may be that the terminal device receives the third configuration information, and determines, according to the third configuration information, that the terminal device is configured to transmit information and receive information in time periods of different durations.

For another example, that the terminal device determines that the terminal device is not configured with more than one uplink carrier may be: when the terminal device has not received the first configuration information transmitted by the network device, the terminal device determines that the terminal device is not configured with more than one uplink carrier; or the terminal device receives the first configuration information transmitted by the network device, and determines, according to the first configuration information, that the terminal device is not configured with more than one uplink carrier or is configured with only one uplink carrier.

That the third configuration information is used to instruct to configure a duration of a time period for receiving information and a duration of a time period for transmitting information by the terminal device to be different may be that the third configuration information is used to instruct to configure the terminal device to receive information in the first time period and transmit information in the second time period. For example, a physical downlink shared channel (PDSCH) is received in the first time period, that is, the PDSCH is transmitted in the duration of the first time period; and a PUSCH is transmitted in the second time period, that is, the PUSCH is received in the duration of the second time period.

Optionally, the PUSCH is transmitted in a TTI of 1 ms, and the PDSCH is received in two OFDM symbols.

In this embodiment, the terminal device receives the first indication information in the first time period; and the terminal device transmits the first information in the second time period, where the duration of the first time period is the first time unit, the duration of the second time period is the second time unit, and the duration of the second time unit is greater than the duration of the first time unit. In this way, although the terminal device receives the first indication information in a first time unit N, the terminal device transmits the first information in a second time unit M whose duration is greater than that of the first time unit. Therefore, a disadvantage that a system capacity is reduced due to lack of uplink transmission resources for transmitting the first information by the terminal device is avoided.

Figure 3:
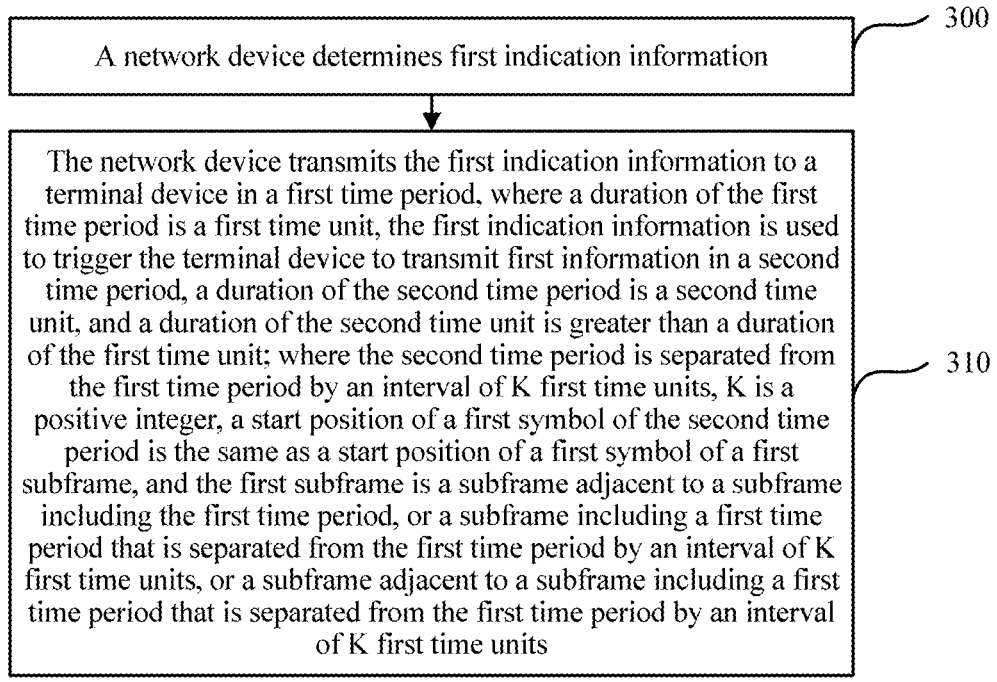
FIG. 3 is a flowchart of another data communication method according to an embodiment of the present disclosure.

Referring to FIG. 3, in an embodiment of the present disclosure, a procedure of data communication method is as follows:

Step 300: A network device determines first indication information.

Step 310: The network device transmits the first indication information to a terminal device in a first time period, where a duration of the first time period is a first time unit, the first indication information is used to trigger the terminal device to transmit first information in a second time period, a duration of the second time period is a second time unit, and a duration of the second time unit is greater than a duration of the first time unit.

An interval of K first time units exists between the second time period and the first time period, K is a positive integer, a start position of a first symbol of the second time period is the same as a start position of a first symbol of a first subframe, and the first subframe is a subframe adjacent to a subframe including the first time period, or a subframe including a first time period which has an interval of K first time units with the first time period, or a subframe adjacent to a subframe including a first time period which has an interval of K first time units with the first time period.

In this embodiment of the present disclosure, optionally, K is 4.

When the first subframe is the subframe adjacent to the subframe including the first time period, a subframe 2 is the first subframe, as shown in FIG. 2B.

When the first subframe is the subframe including the first time period that is separated from the first time period by an interval of K first time units, a subframe 2 is the first subframe, as shown in FIG. 2C; or a subframe 3 is the first subframe, as shown in FIG. 2D.

When the first subframe is the subframe adjacent to the subframe including the first time period that is separated from the first time period by an interval of K first time units, a subframe 2 is the first subframe, as shown in FIG. 2B; or a subframe 3 is the first subframe, as shown in FIG. 2E.

Certainly, the first subframe is not limited to the foregoing several manners, and may have other manners. Details are not described exhaustively herein.

In this embodiment of the present disclosure, after the network device transmits the first indication information to the terminal device in the first time period, the method further includes:

the network device receives the first information transmitted by the terminal device in the second time period.

In this embodiment of the present disclosure, before the network device receives the first information transmitted by the terminal device, the method further includes:

the network device transmits second indication information to the terminal device, where the second indication information is used to trigger the terminal device to transmit second information in a third time period, a duration of the third time period is the first time unit, and at least one part or an entirety of the third time period overlaps the second time period; and the network device receives the second information transmitted by the terminal device in the third time period according to the second indication information, or the second information transmitted in a $J^{th}$ first time unit after the second time period, where J is a positive integer greater than or equal to 1.

It should be noted that, the first information may be an aperiodic CSI report, and the second information may be a periodic CSI report. Herein the periodic CSI report and the aperiodic CSI report may correspond to a same carrier, or may correspond to different carriers. Alternatively, the first information is an aperiodic CSI report, and the second information is also an aperiodic CSI report. Herein the two aperiodic CSI reports may be two parts of an aperiodic CSI report, or may be two aperiodic CSI reports.

Before the network device transmits the first indication information to the terminal device in the first time period, the method further includes:

the network device receives first notification information transmitted by the terminal device, where the first notification information is used to notify the network device that the terminal device is capable of simultaneously transmitting information in a time period whose duration is the first time unit and a time period whose duration is the second time unit.

It should be noted that, a time sequence of transmitting the first indication information and receiving the first notification information is not limited. The first indication information may be transmitted first and then the first notification information is received, or the first notification information may be received first and then the first indication information is transmitted. A preferred solution is first receiving the first notification information and then transmitting the first indication information.

The method further includes:

the network device transmits first configuration information to the terminal device, where the first configuration information is used to configure the terminal device to be capable of simultaneously transmitting information in a time period whose duration is the first time unit and a time period whose duration is the second time unit.

It should be noted that, transmitting the first configuration information may be transmitting the first configuration information on a basis of receiving the first notification information or without receiving the first notification information.

The method further includes:

the network device receives second notification information transmitted by the terminal device, where the second notification information is used to notify the network device that the terminal device is incapable of simultaneously transmitting information in a time period whose duration is the first time unit and a time period whose duration is the second time unit.

The method further includes:

the network device transmits second configuration information to the terminal device, where the second configuration information is used to configure the terminal device to be incapable of simultaneously transmitting information in a time period whose duration is the first time unit and a time period whose duration is the second time unit.

It should be noted that, transmitting the second configuration information may be transmitting the second configuration information on a basis of receiving the second notification information or without the second notification information.

In this embodiment of the present disclosure, carriers for transmitting the first indication information and receiving the first information by the network device may be a same carrier, or may be different carriers. Therefore, in this embodiment of the present disclosure, that the network device transmits the first indication information to a terminal device in a first time period includes:

the network device transmits the first indication information to the terminal device in the first time period in a first carrier; and that the network device receives the first information transmitted by the terminal device in the second time period includes:

the network device receives the first information in the second time period in the first carrier or a second carrier.

Optionally, when a communications system is FDD, carriers for receiving the first indication information and transmitting the first information by the terminal device may be different carriers; or when a communications system is TDD, carriers for receiving the first indication information and transmitting the first information by the terminal device may be a same carrier.

The method further includes:

the network device receives third notification information transmitted by the terminal device, where the third notification information is used to notify the network device that the terminal device is capable of transmitting information in a time period whose duration is the second time unit and capable of receiving information in a time period whose duration is the first time unit.

The method further includes:

the network device transmits third configuration information to the terminal device, where the third configuration information is used to configure the terminal device to be capable of transmitting information in a time period whose duration is the second time unit and capable of receiving information in a time period whose duration is the first time unit.

It should be noted that, transmitting the third configuration information may be transmitting the third configuration information on a basis of receiving the third notification information or without receiving the third notification information.

The method further includes:

the network device transmits third information in the first time period.

The method further includes:

the network device receives fourth notification information transmitted by the terminal device, where the fourth notification information is used to notify the network device that the terminal device is incapable of transmitting information in a plurality of uplink carriers.

The method further includes:

the network device transmits fourth configuration information to the terminal device, where the fourth configuration information is used to configure the terminal device to be capable of transmitting information in a single uplink carrier.

It should be noted that, transmitting the fourth configuration information may be transmitting the fourth configuration information on a basis of receiving the fourth notification information or without receiving the fourth notification information.

The method further includes:

the network device transmits at least one of first configuration information, second configuration information, or third configuration information to the terminal device, where the first configuration information is used to instruct to configure only one uplink carrier for the terminal device, the second configuration information is used to instruct to configure the terminal device to simultaneously transmit information in the second time period and the first time period, and the third configuration information is used to instruct to configure a duration of a time period for receiving information and a duration of a time period for transmitting information by the terminal device to be different.

It should be noted that, herein a first channel or a second channel may be an uplink physical channel or an uplink signal, for example, a PUCCH, a PUSCH, or an SRS.

In this embodiment of the present disclosure, optionally, the duration of the second time unit is a duration of one subframe, and the duration of the first time unit is less than or equal to a duration of one timeslot.

In this embodiment of the present disclosure, optionally, the duration of the second time unit may also be a duration of one timeslot, and the duration of the first time unit is less than a duration of one timeslot. It should be noted that, for a communications system in which a subcarrier spacing is 15 kHz, a duration of one timeslot is 0.5 ms, and a duration of one subframe is 1 ms. For a communications system in which a subcarrier spacing is greater than 15 kHz, a duration of one timeslot may be a time unit less than 0.5 ms, and a duration of one subframe may be a time unit less than 1 ms. Herein the duration of the timeslot and the duration of the subframe are not specifically limited.

In this embodiment of the present disclosure, both the first indication information and the second indication information include a CSI reporting request and/or time unit switching information.

In this embodiment of the present disclosure, optionally, the CSI reporting request includes at least one of CSI reporting time information, CSI type information, or frequency domain information for CSI reporting.

In this embodiment of the present disclosure, optionally, the CSI type information indicates whether CSI is periodic CSI or aperiodic CSI.

For example, if the frequency domain information includes subband information, the terminal device transmits the first information according to the subband information, and the first information includes CSI of a subband; if the frequency domain information includes subband group information, the terminal device transmits the first information according to the subband group information, and the first information includes CSI of each subband in a subband group; if the frequency domain information includes carrier information, the terminal device transmits the first information according to the carrier information, and the first information includes CSI of a carrier; or if the frequency domain information includes carrier group information, the terminal device transmits the first information according to the carrier group information, and the first information includes CSI of each carrier in a carrier group.

In this embodiment of the present disclosure, optionally, the time unit switching information includes time unit switching time information and/or time unit duration switching indication information.

The time unit duration switching indication information includes at least one of indication information about a first time unit, indication information about a second time unit, indication information about a long TTI, indication information about a short TTI, subframe indication information, timeslot indication information, or symbol indication information. The time unit switching time information includes at least one of a time of switching from a first time unit to a second time unit, a time of switching from a second time unit to a first time unit, a quantity of first time units traversed during switching from a first time unit to a second time unit, a minimum quantity of first time units traversed during switching from a first time unit to a second time unit, a maximum quantity of first time units traversed during switching from a first time unit to a second time unit, a quantity of second time units traversed during switching from a second time unit to a first time unit, a minimum quantity of second time units traversed during switching from a second time unit to a first time unit, or a maximum quantity of second time units traversed during switching from a second time unit to a first time unit.

It should be noted that, a precondition for receiving the first information by the network device is: the network device determines that the terminal device is incapable of performing transmission in a plurality of uplink carriers, and/or the network device does not transmit, to the terminal device, information for instructing to configure not more than one uplink carrier.

"The terminal device is incapable of performing transmission in a plurality of uplink carriers" may be understood as "the network device determines, according to capability information reported by the terminal device, that the terminal device is capable of performing transmission only in a single uplink carrier", that is, the terminal device is capable of transmitting information only in a single uplink carrier.

"The network device does not transmit, to the terminal device, information for instructing to configure not more than one uplink carrier" may be understood as "the terminal device determines, according to the indication information, that the terminal device is not configured with more than one uplink carrier", that is, the terminal device is configured with only one uplink carrier.

It should be noted that, "the network device transmits, to the terminal device, information for instructing to configure not more than one uplink carrier" may also be described as "the network device transmits, to the terminal device, information for instructing to configure not more than one serving cell"; "the terminal device is not configured with more than one uplink carrier" may also be described as "the terminal device is not configured with more than one serving cell"; and "the terminal device is capable of performing transmission only in a single uplink carrier" may also be described as "the terminal device is capable of transmitting information in only one serving cell".

It should be noted that, in this embodiment of the present disclosure, whether the terminal device is configured to perform some operations or have some capabilities may be determined according to received configuration information transmitted by the network device. Therefore, further, the terminal device receives at least one of first configuration information, second configuration information, or third configuration information transmitted by the network device. The first configuration information is used to configure only one uplink carrier for the terminal device. Further, the first configuration information may be further used to instruct to configure more than one uplink carrier for the terminal device. The second configuration information is used to indicate that the terminal device is configured to be capable of simultaneously transmitting information in a time period whose duration is the first time unit and a time period whose duration is the second time unit. Further, the second configuration information is further used to indicate that the terminal device is not configured to be capable of simultaneously transmitting information in a time period whose duration is the first time unit and a time period whose duration is the second time unit. The third configuration information is used to instruct to configure a duration of a time period for receiving information and a duration of a time period for transmitting information by the terminal device to be different. Further, the third configuration information is further used to instruct to configure a duration of a time period for receiving information and a duration of a time period for transmitting information by the terminal device to be the same.

For example, that the terminal device is configured to be capable of simultaneously transmitting information in a time period whose duration is the first time unit and a time period whose duration is the second time unit may be: the terminal device receives the second configuration information transmitted by the network device, and the terminal device determines, according to the second configuration information, that the terminal device is configured to be capable of simultaneously transmitting information in a time period whose duration is the first time unit and a time period whose duration is the second time unit.

For another example, that the terminal device is not configured to be capable of simultaneously transmitting information in a time period whose duration is the first time unit and a time period whose duration is the second time unit may be that the terminal device has not received the second configuration information transmitted by the network device.

For another example, that the terminal device configures a duration of a time period for receiving information and a duration of a time period for transmitting information by the terminal device to be different may be that the terminal device receives the third configuration information, and determines, according to the third configuration information, that the terminal device is configured to transmit information and receive information in time periods of different durations.

For another example, that the terminal device determines that the terminal device is not configured with more than one uplink carrier may be: when the terminal device has not received the first configuration information transmitted by the network device, the terminal device determines that the terminal device is not configured with more than one uplink carrier; or the terminal device receives the first configuration information transmitted by the network device, and determines, according to the first configuration information, that the terminal device is not configured with more than one uplink carrier or is configured with only one uplink carrier.

That the third configuration information is used to instruct to configure a duration of a time period for receiving information and a duration of a time period for transmitting information by the terminal device to be different may be that the third configuration information is used to instruct to configure the terminal device to receive information in the first time period and transmit information in the second time period. For example, a physical downlink shared channel (PDSCH) is received in the first time period, that is, the PDSCH is transmitted in the duration of the first time period; and a PUSCH is transmitted in the second time period, that is, the PUSCH is transmitted in the duration of the second time period.

Optionally, the PUSCH is transmitted in a TTI of 1 ms, and the PDSCH is received in two OFDM symbols.

In this embodiment, the terminal device receives the first indication information in the first time period; and the terminal device transmits the first information in the second time period, where the duration of the first time period is the first time unit, the duration of the second time period is the second time unit, and the duration of the second time unit is greater than the duration of the first time unit. In this way, although the terminal device receives the first indication information in a first time unit N, the terminal device transmits the first information in a second time unit M whose duration is greater than that of the first time unit. Therefore, a disadvantage that a system capacity is reduced due to lack of uplink transmission resources for transmitting the first information by the terminal device is avoided.

Figure 4:
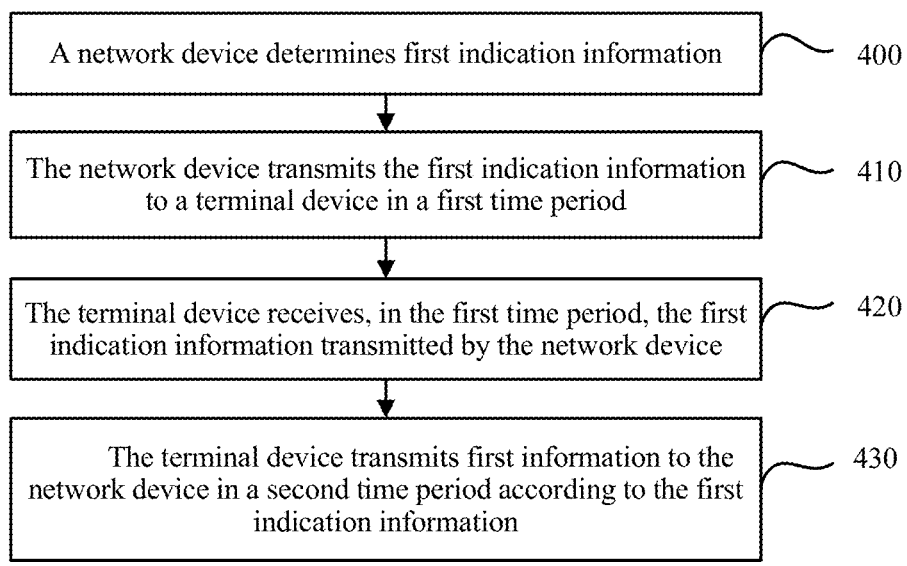
FIG. 4 is a flowchart of another data communication method according to an embodiment of the present disclosure.

Referring to FIG. 4, the following describes a procedure of data communication method from a perspective of interaction between a terminal device and a network device. A specific process is as follows:

Step 400: The network device determines first indication information.

Step 410: The network device transmits the first indication information to the terminal device in a first time period.

Step 420: The terminal device receives, in the first time period, the first indication information transmitted by the network device, Step 430: The terminal device transmits first information to the network device in a second time period according to the first indication information.

In this step, an interval of K first time units exists between the second time period and the first time period, K is a positive integer, a start position of a first symbol of the second time period is the same as a start position of a first symbol of a first subframe, and the first subframe is a subframe adjacent to a subframe including the first time period, or a subframe including a first time period which has an interval of K first time units with the first time period, or a subframe adjacent to a subframe including a first time period which has an interval of K first time units with the first time period.

In this embodiment of the present disclosure, optionally, K is 4.

When the first subframe is the subframe adjacent to the subframe including the first time period, a subframe 2 is the first subframe, as shown in FIG. 2B.

When the first subframe is the subframe including the first time period that is separated from the first time period by an interval of K first time units, a subframe 2 is the first subframe, as shown in FIG. 2C; or a subframe 3 is the first subframe, as shown in FIG. 2D.

When the first subframe is the subframe adjacent to the subframe including the first time period that is separated from the first time period by an interval of K first time units, a subframe 2 is the first subframe, as shown in FIG. 2B; or a subframe 3 is the first subframe, as shown in FIG. 2E.

Certainly, the first subframe is not limited to the foregoing several manners, and may have other manners. Details are not described exhaustively herein.

In this embodiment of the present disclosure, before the terminal device transmits the first information in the second time period according to the first indication information, the method further includes:

the terminal device receives second indication information, where the second indication information is used to trigger the terminal device to transmit second information in a third time period, a duration of the third time period is a first time unit, and at least one part or an entirety of the third time period overlaps the second time period.

It should be noted that, that at least one part or an entirety of the third time period overlaps the second time period indicates that the third time period overlaps the second time period in a time domain, or certainly may indicate other meanings. Details are not described exhaustively herein.

Further, the terminal device transmits first notification information to the network device, where the first notification information is used to notify the network device that the terminal device is capable of simultaneously transmitting information in a time period whose duration is the first time unit and a time period whose duration is a second time unit.

It should be noted that, a time sequence of receiving the first indication information and transmitting the first notification information is not limited. The first indication information may be received first and then the first notification information is transmitted, or the first notification information may be transmitted first and then the first indication information is received. A preferred solution is firm transmitting the first notification information and then receiving the first indication information.

Before the terminal device transmits the first information in the second time period according to the first indication information, the method further includes:

the terminal device receives first configuration information transmitted by the network device, where the first configuration information is used to configure the terminal device to be capable of simultaneously transmitting information in a time period whose duration is the first time unit and a time period whose duration is the second time unit.

It should be noted that, receiving the first configuration information may be receiving the first configuration information on a basis of transmitting the first notification information or without transmitting the first notification information.

After the terminal device receives the second indication information, the method further includes:

the terminal device determines whether a sum of a transmit power of a first channel carrying the first information and a transmit power of a second channel carrying the second information is less than or equal to a first threshold, where the first threshold is a maximum transmit power value allowed by the terminal device; and if yes, the terminal device transmits the second information in the third time period according to the second indication information;

otherwise, the terminal device stops transmitting the second information in the third time period; or the terminal device discards the second information; or the terminal device reduces the transmit power of the second channel carrying the second information, and when determining that a reduction value of the transmit power of the second channel is less than a second threshold, uses a reduced transmit power of the second channel to transmit the second information.

It should be noted that, herein the first channel or the second channel may be an uplink physical channel or an uplink signal, for example, a PUCCH, a PUSCH, or an SRS.

It should be noted that, "the terminal device is capable of simultaneously transmitting information in a time period whose duration is the first time unit and a time period whose duration is the second time unit" may be understood as "when the time period whose duration is the first time unit overlaps the time period whose duration is the second time unit, the terminal device is capable of simultaneously transmitting information in the second time unit and the first time unit"; and "the terminal device is configured to simultaneously transmit information in a time period whose duration is the first time unit and a time period whose duration is the second time unit" may be understood as "when the time period whose duration is the first time unit overlaps the time period whose duration is the second time unit, the terminal device is configured by the network device and allowed to simultaneously transmit information in the time period whose duration is the first time unit and the time period whose duration is the second time unit".

In this embodiment of the present disclosure, optionally; the reduced transmit power of the second channel is less than or equal to a difference between the first threshold and the transmit power of the first channel.

After the terminal device receives the second indication information, the method further includes:

the terminal device determines whether a sum of a transmit power of a first channel carrying the first information and a transmit power of a second channel carrying the second information is less than or equal to a first threshold, where the first threshold is a maximum transmit power value allowed by the terminal device; and if yes, the terminal device transmits the second information in the third time period according to the second indication information;

otherwise, the terminal device stops transmitting the second information in the third time period; or the terminal device discards the second information; or the terminal device reduces the transmit power of the second channel carrying the second information, and when determining that a reduction value of the transmit power of the second channel is less than a second threshold, uses a reduced transmit power of the second channel to transmit the second information.

In this embodiment of the present disclosure, optionally, if the reduction value of the transmit power of the second channel is greater than or equal to the second threshold, the terminal device stops transmitting the second information in the third time period, or the terminal device discards the second information, where the second threshold may be the transmit power of the second channel×T, and a value range of T is (0, 1), and 0<T≤1. Optionally, T=0.75.

The terminal device transmits second notification information to the network device, where the second notification information is used to notify the network device that the terminal device is incapable of simultaneously transmitting information in a time period whose duration is the first time unit and a time period whose duration is the second time unit.

Before the terminal device transmits the first information in the second time period according to the first indication information, the method further includes:

the terminal device receives second configuration information, where the second configuration information is used to configure the terminal device to be incapable of simultaneously transmitting information in a time period whose duration is the first time unit and a time period whose duration is the second time unit.

It should be noted that, receiving the second configuration information may be receiving the second configuration information on a basis of transmitting the second notification information or without transmitting the second notification information.

After the terminal device receives the first indication information in the first time period, the method further includes:

the terminal device stops transmitting the second information in the third time period, or the terminal device discards the second information.

It should be noted that, that the terminal device stops transmitting the second information or discards the second information may be that the terminal device stops transmitting the second information in the third time period or discards the second information. To successfully transmit the second information, in this embodiment of the present disclosure, after the terminal device stops transmitting the second information in the third time period, or discards the second information, the method further includes:

the terminal device transmits the second information in a $J^{th}$ first time period after the second time period, where J is a positive integer greater than or equal to 1.

In this embodiment of the present disclosure, carriers for receiving the first indication information and transmitting the first information by the terminal device may be a same carrier, or may be different carriers. Therefore, in this embodiment of the present disclosure, optionally, the terminal device may receive the first indication information in the first time period in the following manner:

the terminal device receives the first indication information in the first time period in a first carrier; and that the terminal device transmits first information in a second time period according to the first indication information includes:

the terminal device transmits the first information in the second time period in the first carrier or a second carrier.

Optionally, when a communications system is FDD, carriers for receiving the first indication information and transmitting the first information by the terminal device may be different carriers; or when a communications system is TDD, carriers for receiving the first indication information and transmitting the first information by the terminal device may be a same carrier.

The terminal device transmits third notification information to the network device, where the third notification information is used to notify the network device that the terminal device is capable of transmitting information in a time period whose duration is the second time unit and capable of receiving information in a time period whose duration is the first time unit.

The method further includes:

the terminal device receives third configuration information, where the third configuration information is used to configure the terminal device to be capable of transmitting information in a time period whose duration is the second time unit and capable of receiving information in a time period whose duration is the first time unit.

It should be noted that, receiving the third configuration information may be receiving the third configuration information on a basis of transmitting the third notification information or without transmitting the third notification information.

After the terminal device receives the third configuration information, the method further includes:

the terminal device receives third information in a time period whose duration is the first time unit.

Before the terminal device transmits the first information in the second time period according to the first indication information, the method further includes:

the terminal device transmits fourth notification information to the network device, where the fourth notification information is used to notify the network device that the terminal device is incapable of transmitting information in a plurality of uplink carriers.

The method further includes:

the terminal device receives fourth configuration information, where the fourth configuration information is used to configure the terminal device to be capable of transmitting information in a single uplink carrier.

It should be noted that, receiving the fourth configuration information may be receiving the fourth configuration information on a basis of transmitting the fourth notification information or without transmitting the fourth notification information.

"The terminal device is incapable of performing transmission in a plurality of uplink carriers" may be understood as "the terminal device is capable of performing transmission only in a single uplink carrier", that is, the terminal device is capable of transmitting information only in a single uplink carrier.

"The terminal device is not configured with more than one uplink carrier" may be understood as "the terminal device is configured with only one uplink carrier".

It should be noted that, "the terminal device is not configured with more than one uplink carrier" may also be described as "the terminal device is not configured with more than one serving cell"; and "the terminal device is capable of performing transmission only in a single uplink carrier" may also be described as "the terminal device is capable of transmitting information in only one serving cell".

A case in which the terminal device may transmit the first information in a second time unit M is described above. In an actual application, the following case may also be included: If the terminal device is capable of performing transmission in a plurality of uplink carriers and/or is configured with more than one uplink carrier, the terminal device does not transmit the first information.

In this embodiment of the present disclosure, a channel carrying the first indication information may be at least one of a PDCCH, a PHICH, or an EPDCCH.

Likewise, a channel carrying the second indication information may be at least one of the PDCCH, the PHICH, or the EPDCCH.

In this embodiment of the present disclosure, optionally, a duration of the second time unit may be a duration of one subframe, and a duration of the first time unit is less than or equal to a duration of one timeslot Alternatively, a duration of the second time unit may be a duration of one timeslot, and a duration of the first time unit is less than a duration of one timeslot. It should be noted that, for a communications system in which a subcarrier spacing is 15 kHz, a duration of one timeslot is 0.5 ms, and a duration of one subframe is 1 ms. For a communications system in which a subcarrier spacing is greater than 15 kHz, a duration of one timeslot may be a time unit less than 0.5 ms, and a duration of one subframe may be a time unit less than 1 ms. Herein the duration of the timeslot and the duration of the subframe are not specifically limited.

In this embodiment of the present disclosure, optionally, both the first indication information and the second indication information include a CSI reporting request and/or time unit switching information.

In this embodiment of the present disclosure, optionally, the CSI reporting request includes at least one of CSI reporting time information, CSI type information, or frequency domain information for CSI reporting.

In this embodiment of the present disclosure, optionally, the CSI type information indicates whether CSI is periodic CSI or aperiodic CSI.

In this embodiment of the present disclosure, optionally, the frequency domain information for CSI reporting includes at least one of subband information, subband group information, carrier information, or carrier group information.

For example, if the frequency domain information includes the subband information, the terminal device transmits the first information according to the subband information, and the first information includes CSI of a subband; if the frequency domain information includes the subband group information, the terminal device transmits the first information according to the subband group information, and the first information includes CSI of each subband in a subband group; if the frequency domain information includes the carrier information, the terminal device transmits the first information according to the carrier information, and the first information includes CSI of a carrier; or if the frequency domain information includes the carrier group information, the terminal device transmits the first information according to the carrier group information, and the first information includes CSI of each carrier in a carrier group.

In this embodiment of the present disclosure, optionally, the time unit switching information includes time unit switching time information and/or time unit duration switching indication information.

The time unit duration switching indication information includes at least one of indication information about a first time unit, indication information about a second time unit, indication information about a long TTI, indication information about a short TTI, subframe indication information, timeslot indication information, or symbol indication information.

The time unit switching time information includes at least one of a time of switching from a first time unit to a second time unit, a time of switching from a second time unit to a first time unit, a quantity of first time units traversed during switching from a first time unit to a second time unit, a minimum quantity of first time units traversed during switching from a first time unit to a second time unit, a maximum quantity of first time units traversed during switching from a first time unit to a second time unit, a quantity of second time units traversed during switching from a second time unit to a first time unit, a minimum quantity of second time units traversed during switching from a second time unit to a first time unit, or a maximum quantity of second time units traversed during switching from a second time unit to a first time unit.

In this embodiment of the present disclosure, "the terminal device is capable of simultaneously transmitting information in a time period whose duration is the first time unit and a time period whose duration is the second time unit" may also be described as "the terminal device supports a function of being capable of simultaneously transmitting information in a time period whose duration is the first time unit and a time period whose duration is the second time unit".

Terms "more than one" and "at least two" described in this embodiment of the present disclosure have a same meaning, and may replace each other in use. This is not specifically limited herein.

It should be noted that, in this embodiment of the present disclosure, whether the terminal device is configured to perform some operations or have some capabilities may be determined according to received configuration information transmitted by the network device. Therefore, further, the terminal device receives at least one of first configuration information, second configuration information, or third configuration information transmitted by the network device. The first configuration information is used to configure only one uplink carrier for the terminal device. Further, the first configuration information may be further used to instruct to configure more than one uplink carrier for the terminal device. The second configuration information is used to indicate that the terminal device is configured to be capable of simultaneously transmitting information in a time period whose duration is the first time unit and a time period whose duration is the second time unit. Further, the second configuration information is further used to indicate that the terminal device is not configured to be capable of simultaneously transmitting information in a time period whose duration is the first time unit and a time period whose duration is the second time unit. The third configuration information is used to instruct to configure a duration of a time period for receiving information and a duration of a time period for transmitting information by the terminal device to be different. Further, the third configuration information is further used to instruct to configure a duration of a time period for receiving information and a duration of a time period for transmitting information by the terminal device to be the same.

For example, that the terminal device is configured to be capable of simultaneously transmitting information in a time period whose duration is the first time unit and a time period whose duration is the second time unit may be: the terminal device receives the second configuration information transmitted by the network device, and the terminal device determines, according to the second configuration information, that the terminal device is configured to be capable of simultaneously transmitting information in a time period whose duration is the first time unit and a time period whose duration is the second time unit.

For another example, that the terminal device is not configured to be capable of simultaneously transmitting information in a time period whose duration is the first time unit and a time period whose duration is the second time unit may be that the terminal device has not received the second configuration information transmitted by the network device.

For another example, that the terminal device configures a duration of a time period for receiving information and a duration of a time period for transmitting information by the terminal device to be different may be that the terminal device receives the third configuration information, and determines, according to the third configuration information, that the terminal device is configured to transmit information and receive information in time periods of different durations.

For another example, that the terminal device determines that the terminal device is not configured with more than one uplink carrier may be: when the terminal device has not received the first configuration information transmitted by the network device, the terminal device determines that the terminal device is not configured with more than one uplink carrier; or the terminal device receives the first configuration information transmitted by the network device, and determines, according to the first configuration information, that the terminal device is not configured with more than one uplink carrier or is configured with only one uplink carrier.

That the third configuration information is used to instruct to configure a duration of a time period for receiving information and a duration of a time period for transmitting information by the terminal device to be different may be that the third configuration information is used to instruct to configure the terminal device to receive information in the first time period and transmit information in the second time period. For example, a PDSCH is received in the first time period, that is, the PDSCH is transmitted in a duration of the first time period; and a PUSCH is transmitted in the second time period, that is, the PUSCH is transmitted in a duration of the second time period.

Optionally, the PUSCH is transmitted in a TTI of 1 ms, and the PDSCH is received in two OFDM symbols.

In this embodiment, the terminal device receives the first indication information in the first time period; and the terminal device transmits the first information in the second time period, where the duration of the first time period is the first time unit, the duration of the second time period is the second time unit, and the duration of the second time unit is greater than the duration of the first time unit. In this way, although the terminal device receives the first indication information in a first time unit N, the terminal device transmits the first information in a second time unit M whose duration is greater than that of the first time unit. Therefore, a disadvantage that a system capacity is reduced due to lack of uplink transmission resources for transmitting the first information by the terminal device is avoided.

Figure 5A:
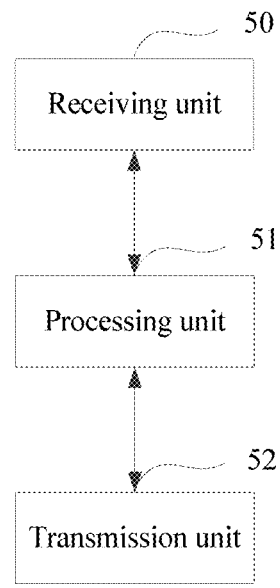
FIG. 5A is a schematic diagram of a terminal device according to an embodiment of the present disclosure.

Referring to FIG. 5A, an embodiment of the present disclosure further provides a terminal device. The terminal device includes a receiving unit 50, a processing unit 51, and a transmission unit 52.

The receiving unit 50 is configured to receive first indication information in a first time period, where a duration of the first time period is a first time unit.

The processing unit 51 is configured to trigger, according to the first indication information, the transmission unit 52 to transmit first information in a second time period.

The transmission unit 52 is configured to transmit the first information in the second time period, where a duration of the second time period is a second time unit, and a duration of the second time unit is greater than a duration of the first time unit.

An interval of K first time units exists between the second time period and the first time period, K is a positive integer, a start position of a first symbol of the second time period is the same as a start position of a first symbol of a first subframe, and the first subframe is a subframe adjacent to a subframe including the first time period, or a subframe including a first time period which has an interval of K first time units with the first time period, or a subframe adjacent to a subframe including a first time period which has an interval of K first time units with the first time period.

The receiving unit 50 is further configured to:
receive second indication information; and
the processing unit 51 is further configured to trigger the transmission unit 52 to transmit second information in a third time period, where a duration of the third time period is the first time unit, and at least one part or an entirety of the third time period overlaps the second time period.

The transmission unit 52 is further configured to:
transmit first notification information to a network device, where the first notification information is used to notify the network device that the terminal device is capable of simultaneously transmitting information in a time period whose duration is the first time unit and a time period whose duration is the second time unit.

The receiving unit 50 is further configured to:
receive first configuration information transmitted by the network device; and
the processing unit 51 is further configured to configure, according to the first configuration information, the terminal device to be capable of simultaneously transmitting information in a time period whose duration is the first time unit and a time period whose duration is the second time unit.

The processing unit 51 is further configured to determine whether a sum of a transmit power of a first channel carrying the first information and a transmit power of a second channel carrying the second information is less than or equal to a first threshold, where the first threshold is a maximum transmit power value allowed by the terminal device;

the transmission unit 52 is further configured to transmit the second information in the third time period according to the second indication information when the processing unit 51 determines that the sum of the transmit power of the first channel carrying the first information and the transmit power of the second channel carrying the second information is less than or equal to the first threshold; and the processing unit 51 is further configured to: when the processing unit 51 determines that the sum of the transmit power of the first channel carrying the first information and the transmit power of the second channel carrying the second information is greater than the first threshold, stop transmitting the second information in the third time period; or discard the second information; or reduce the transmit power of the second channel carrying the second information, and when determining that a reduction value of the transmit power of the second channel is less than a second threshold, use a reduced transmit power of the second channel to transmit the second information.

The processing unit 51 is further configured to:

if the reduction value of the transmit power of the second channel is greater than or equal to the second threshold, stop transmitting the second information in the third time period, or discard the second information, where the second threshold is equal to the transmit power of the second channel×T, and a value range of T is (0, 1).

The transmission unit 52 is further configured to:

transmit second notification information to a network device, where the second notification information is used to notify the network device that the terminal device is incapable of simultaneously transmitting information in a time period whose duration is the first time unit and a time period whose duration is the second time unit.

The receiving unit 50 is further configured to:

receive second configuration information; and the processing unit 51 is further configured to configure, according to the second configuration information, the terminal device to be incapable of simultaneously transmitting information in a time period whose duration is the first time unit and a time period whose duration is the second time unit.

The transmission unit 52 is further configured to stop transmitting the second information in the third time period, or discard the second information.

The transmission unit 52 is further configured to:

transmit the second information in a $J^{th}$ first time period after the second time period, where J is a positive integer greater than or equal to 1.

The receiving unit 50 is specifically configured to:

receive the first indication information in the first time period in a first carrier; and the transmission unit 52 is specifically configured to:

transmit the first information in the second time period in the first carrier or a second carrier.

The transmission unit 52 is further configured to:

transmit third notification information to the network device, where the third notification information is used to notify the network device that the terminal device is capable of transmitting information in a time period whose duration is the second time unit and capable of receiving information in a time period whose duration is the first time unit.

The receiving unit 50 is further configured to:

receive third configuration information; and the processing unit 51 is further configured to configure, according to the third configuration information, the terminal device to be capable of transmitting information in a time period whose duration is the second time unit and capable of receiving information in a time period whose duration is the first time unit.

The receiving unit 50 is further configured to:

receive third information in a time period whose duration is the first time unit.

The transmission unit 52 is further configured to:

transmit fourth notification information to the network device, where the fourth notification information is used to notify the network device that the terminal device is incapable of transmitting information in a plurality of uplink carriers.

The receiving unit 50 is further configured to:

receive fourth configuration information; and the processing unit 51 is further configured to configure, according to the fourth configuration information, the terminal device to be capable of transmitting information in a single uplink carrier.

Figure 5B:
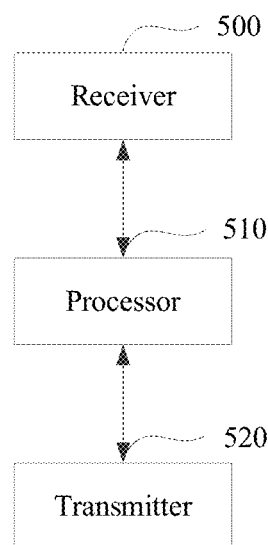
FIG. 5B is another schematic diagram of a terminal device according to an embodiment of the present disclosure.

Referring to FIG. 5B, an embodiment of the present disclosure further provides a terminal device. The terminal device includes a receiver 500, a processor 510, and a transmitter 520.

The receiver 500 is configured to receive first indication information in a first time period, where a duration of the first time period is a first time unit.

The processor 510 is configured to trigger, according to the first indication information, the transmitter 520 to transmit first information in a second time period.

The transmitter 520 is configured to transmit the first information in the second time period, where a duration of the second time period is a second time unit, and a duration of the second time unit is greater than a duration of the first time unit.

An interval of K first time units exists between the second time period and the first time period, K is a positive integer, a start position of a first symbol of the second time period is the same as a start position of a first symbol of a first subframe, and the first subframe is a subframe adjacent to a subframe including the first time period, or a subframe including a first time period which has an interval of K first time units with the first time period, or a subframe adjacent to a subframe including a first time period which has an interval of K first time units with the first time period.

Further, the receiver 500 is further configured to:

receive second indication information; and the processor 510 is further configured to trigger the transmitter 520 to transmit second information in a third time period, where a duration of the third time period is the first time unit, and at least one part or an entirety of the third time period overlaps the second time period.

Further, the transmitter 520 is further configured to:

transmit first notification information to a network device, where the first notification information is used to notify the network device that the terminal device is capable of simultaneously transmitting information in a time period whose duration is the first time unit and a time period whose duration is the second time unit.

Further, the receiver 500 is further configured to:

receive first configuration information transmitted by the network device; and the processor 510 is further configured to configure the terminal device to be capable of simultaneously transmitting information in a time period whose duration is the first time unit and a time period whose duration is the second time unit.

The processor 510 is further configured to determine whether a sum of a transmit power of a first channel carrying the first information and a transmit power of a second channel carrying the second information is less than or equal to a first threshold, where the first threshold is a maximum transmit power value allowed by the terminal device;

the transmitter 520 is further configured to transmit the second information in the third time period according to the second indication information when the processor 510 determines that the sum of the transmit power of the first channel carrying the first information and the transmit power of the second channel carrying the second information is less than or equal to the first threshold; and the processor 510 is further configured to: when the processor 510 determines that the sum of the transmit power of the first channel carrying the first information and the transmit power of the second channel carrying the second information is greater than the first threshold, stop transmitting the second information in the third time period; or discard the second information; or reduce the transmit power of the second channel carrying the second information, and when determining that a reduction value of the transmit power of the second channel is less than a second threshold, use a reduced transmit power of the second channel to transmit the second information.

Further, the processor 510 is further configured to:

if the reduction value of the transmit power of the second channel is greater than or equal to the second threshold, stop transmitting the second information in the third time period, or discard the second information, where the second threshold is equal to the transmit power of the second channel×T, and a value range of T is (0, 1).

Further, the transmitter 520 is further configured to:

transmit second notification information to a network device, where the second notification information is used to notify the network device that the terminal device is incapable of simultaneously transmitting information in a time period whose duration is the first time unit and a time period whose duration is the second time unit.

Further, the receiver 500 is further configured to:

receive second configuration information; and the processor 510 is further configured to configure, according to the second configuration information, the terminal device to be incapable of simultaneously transmitting information in a time period whose duration is the first time unit and a time period whose duration is the second time unit.

Further, the transmitter 520 is further configured to stop transmitting the second information in the third time period, or discard the second information.

Further, the transmitter 520 is further configured to:

transmit the second information in a $J^{th}$ first time period after the second time period, where J is a positive integer greater than or equal to 1.

Optionally, the receiver 500 is specifically configured to:

receive the first indication information in the first time period in a first carrier; and the transmitter 520 is specifically configured to:

transmit the first information in the second time period in the first carrier or a second carrier.

Further, the transmitter 520 is further configured to:

transmit third notification information to the network device, where the third notification information is used to notify the network device that the terminal device is capable of transmitting information in a time period whose duration is the second time unit and capable of receiving information in a time period whose duration is the first time unit.

Further, the receiver 500 is further configured to:

receive third configuration information; and the processor 510 is further configured to configure, according to the third configuration information, the terminal device to be capable of transmitting information in a time period whose duration is the second time unit and capable of receiving information in a time period whose duration is the first time unit.

Further, the transmitter 520 is further configured to:

transmit fourth notification information to the network device, where the fourth notification information is used to notify the network device that the terminal device is incapable of transmitting information in a plurality of uplink carriers.

Further, the receiver 500 is further configured to:

receive fourth configuration information; and.

the processor 510 is further configured to configure, according to the fourth configuration information, the terminal device to be capable of transmitting information in a single uplink carrier.

Figure 6A:
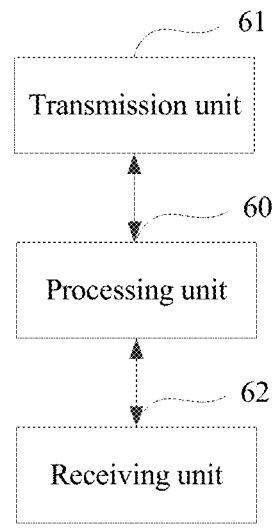
FIG. 6A is a schematic diagram of a network device according to an embodiment of the present disclosure.

Referring to FIG. 6A, an embodiment of the present disclosure further provides a network device. The network device includes a processing unit 60 and a transmission unit 61.

The processing unit 60 is configured to determine first indication information.

The transmission unit 61 is configured to transmit the first indication information to a terminal device in a first time period, where a duration of the first time period is a first time unit, the first indication information is used to trigger the terminal device to transmit first information in a second time period, a duration of the second time period is a second time unit, and a duration of the second time unit is greater than a duration of the first time unit.

An interval of K first time units exists between the second time period and the first time period, K is a positive integer, a start position of a first symbol of the second time period is the same as a start position of a first symbol of a first subframe, and the first subframe is a subframe adjacent to a subframe including the first time period, or a subframe including a first time period which has an interval of K first time units with the first time period, or a subframe adjacent to a subframe including a first time period which has an interval of K first time units with the first time period.

The network device further includes a receiving unit 62, configured to receive the first information transmitted by the terminal device in the second time period.

The transmission unit 61 is further configured to:

transmit second indication information to the terminal device, where the second indication information is used to trigger the terminal device to transmit second information in a third time period, a duration of the third time period is the first time unit, and at least one part or an entirety of the third time period overlaps the second time period; and the receiving unit 62 is further configured to:

receive the second information transmitted by the terminal device in the third time period according to the second indication information, or the second information transmitted in a $J^{th}$ first time unit after the second time period, where J is a positive integer greater than or equal to 1.

The network device further includes the receiving unit 62, configured to receive first notification information transmitted by the terminal device; and the processing unit 60 is further configured to determine, according to the first notification information, that the terminal device is capable of simultaneously transmitting information in a time period whose duration is the first time unit and a time period whose duration is the second time unit.

The transmission unit 61 is further configured to:

transmit first configuration information to the terminal device, where the first configuration information is used to configure the terminal device to be capable of simultaneously transmitting information in a time period whose duration is the first time unit and a time period whose duration is the second time unit.

The network device further includes a receiving unit 62, configured to receive second notification information transmitted by the terminal device; and the processing unit 60 is further configured to determine, according to the second notification information, that the terminal device is incapable of simultaneously transmitting information in a time period whose duration is the first time unit and a time period whose duration is the second time unit.

The transmission unit 61 is further configured to:

transmit second configuration information to the terminal device, where the second configuration information is used to configure the terminal device to be incapable of simultaneously transmitting information in a time period whose duration is the first time unit and a time period whose duration is the second time unit.

The transmission unit 61 is specifically configured to:

transmit the first indication information to the terminal device in the first time period in a first carrier; and the network device further includes the receiving unit 62, configured to receive the first information in the second time period in the first carrier or a second carrier.

The network device further includes the receiving unit 62, configured to receive third notification information transmitted by the terminal device; and the processing unit 60 is further configured to determine, according to the third notification information, that the terminal device is capable of transmitting information in a time period whose duration is the second time unit and capable of receiving information in a time period whose duration is the first time unit.

The transmission unit 61 is further configured to:

transmit third configuration information to the terminal device, where the third configuration information is used to configure the terminal device to be capable of transmitting information in a time period whose duration is the second time unit and capable of receiving information in a time period whose duration is the first time unit.

The transmission unit 61 is further configured to:

transmit third information in the first time period.

The network device further includes the receiving unit 62, configured to receive fourth notification information transmitted by the terminal device; and the processing unit 60 is further configured to determine, according to the fourth notification information, that the terminal device is incapable of transmitting information in a plurality of uplink carriers.

The transmission unit 61 is further configured to:

transmit fourth configuration information to the terminal device, where the fourth configuration information is used to configure the terminal device to be capable of transmitting information in a single uplink carrier.

The transmission unit 61 is further configured to:

transmit at least one of first configuration information, second configuration information, or third configuration information to the terminal device, where the first configuration information is used to instruct to configure only one uplink carrier for the terminal device, the second configuration information is used to instruct to configure the terminal device to simultaneously transmit information in the second time period and the first time period, and the third configuration information is used to instruct to configure a duration of a time period for receiving information and a duration of a time period for transmitting information by the terminal device to be different.

Figure 6B:
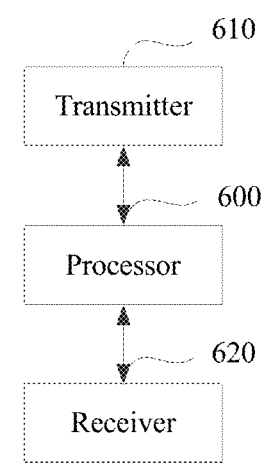
FIG. 6B is another schematic diagram of a network device according to an embodiment of the present disclosure.

Referring to FIG. 6B, an embodiment of the present disclosure further provides a network device. The network device includes a processor 600 and a transmitter 610.

The processor 600 is configured to determine first indication information.

The transmitter 610 is configured to transmit the first indication information to a terminal device in a first time period, where a duration of the first time period is a first time unit, the first indication information is used to trigger the terminal device to transmit first information in a second time period, a duration of the second time period is a second time unit, and a duration of the second time unit is greater than a duration of the first time unit.

An interval of K first time units exists between the second time period and the first time period, K is a positive integer, a start position of a first symbol of the second time period is the same as a start position of a first symbol of a first subframe, and the first subframe is a subframe adjacent to a subframe including the first time period, or a subframe including a first time period which has an interval of K first time units with the first time period, or a subframe adjacent to a subframe including a first time period which has an interval of K first time units with the first time period.

Further, the network device further includes a receiver 620, configured to receive the first information transmitted by the terminal device in the second time period.

Further, the transmitter 610 is further configured to:

transmit second indication information to the terminal device, where the second indication information is used to trigger the terminal device to transmit second information in a third time period, a duration of the third time period is the first time unit, and at least one part or an entirety of the third time period overlaps the second time period; and the receiver 620 is further configured to:

receive the second information transmitted by the terminal device in the third time period according to the second indication information, or the second information transmitted in a $J^{th}$ first time unit after the second time period, where J is a positive integer greater than or equal to 1.

Further, the network device further includes the receiver 620, configured to receive first notification information transmitted by the terminal device; and the processor 600 is further configured to determine, according to the first notification information, that the terminal device is capable of simultaneously transmitting information in a time period whose duration is the first time unit and a time period whose duration is the second time unit.

Further, the transmitter 610 is further configured to:

transmit first configuration information to the terminal device, where the first configuration information is used to configure the terminal device to be capable of simultaneously transmitting information in a time period whose duration is the first time unit and a time period whose duration is the second time unit.

Further, the network device further includes a receiver 620, configured to receive second notification information transmitted by the terminal device; and the processor 600 is further configured to determine, according to the second notification information, that the terminal device is incapable of simultaneously transmitting information in a time period whose duration is the first time unit and a time period whose duration is the second time unit.

Further, the transmitter 610 is further configured to:

transmit second configuration information to the terminal device, where the second configuration information is used to configure the terminal device to be incapable of simultaneously transmitting information in a time period whose duration is the first time unit and a time period whose duration is the second time unit.

Optionally, the transmitter 610 is specifically configured to:

transmit the first indication information to the terminal device in the first time period in a first carrier; and the network device further includes the receiver 620, configured to receive the first information in the second time period in the first carrier or a second carrier.

Further, the network device further includes the receiver 620, configured to receive third notification information transmitted by the terminal device; and the processor 600 is further configured to determine, according to the third notification information, that the terminal device is capable of transmitting information in a time period whose duration is the second time unit and capable of receiving information in a time period whose duration is the first time unit.

Further, the transmitter 610 is further configured to:

transmit third configuration information to the terminal device, where the third configuration information is used to configure the terminal device to be capable of transmitting information in a time period whose duration is the second time unit and capable of receiving information in a time period whose duration is the first time unit.

Further, the network device further includes the receiver 620, configured to receive fourth notification information transmitted by the terminal device; and the processor 600 is further configured to determine, according to the fourth notification information, that the terminal device is incapable of transmitting information in a plurality of uplink carriers.

Further, the transmitter 610 is further configured to:

transmit fourth configuration information to the terminal device, where the fourth configuration information is used to configure the terminal device to be capable of transmitting information in a single uplink carrier.

Persons skilled in the art should understand that the embodiments of the present disclosure may be provided as a method, a system, or a computer program product. Therefore, the present disclosure may use a form of hardware only embodiments, software only embodiments, or embodiments with a combination of software and hardware. Moreover, the present disclosure may use a form of a computer program product that is implemented on one or more computer-usable storage media (including but not limited to a disk memory, a CD-ROM, an optical memory, and the like) that include computer-usable program code.

The present disclosure is described with reference to the flowcharts and/or block diagrams of the method, the device (system), and the computer program product according to the embodiments of the present disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some embodiments of the present disclosure have been described, persons skilled in the art can make changes and modifications to these embodiments once they learn the basic inventive concept. Therefore, the following claims are intended to be construed as to cover the preferred embodiments and all changes and modifications falling within the scope of the present disclosure.

Obviously, persons skilled in the art can make various modifications and variations to the embodiments of the present disclosure without departing from the spirit and scope of the embodiments of the present disclosure. The present disclosure is intended to cover these modifications and variations provided that they fall within the scope of protection defined by the following claims and their equivalent technologies.

What is claimed is:

1. A data communication method, comprising:

receiving, by a terminal device, first indication information in a first time period, wherein a duration of the first time period is a first time unit, and the first indication information is used to trigger the terminal device to transmit first information in a second time period; and transmitting, by the terminal device, the first information in the second time period according to the first indication information, wherein a duration of the second time period is a second time unit, and a duration of the second time unit is a duration of one timeslot, and a duration of the first time unit is less than a duration of one timeslot;

wherein an interval of K first time units exists between the second time period and the first time period, K is a positive integer;

wherein before the transmitting, by the terminal device, the first information in the second time period according to the first indication information, the method further comprises:

receiving, by the terminal device, second indication information, wherein the second indication information is used to trigger the terminal device to transmit second information in a third time period, wherein a duration of the third time period is the first time unit, and wherein at least one part or an entirety of the third time period overlaps the second time period.

2. The method according to claim 1, wherein a start position of a first symbol of the second time period is the same as a start position of a first symbol of a first subframe, and the first subframe is one of: (1) a subframe adjacent to a subframe comprising the first time period, (2) a subframe comprising a first time period which has an interval of K first time units with the first time period, or (3) a subframe adjacent to a subframe comprising a first time period which has an interval of K first time units with the first time period.

3. The method according to claim 2, wherein the method further comprises:
transmitting, by the terminal device, first notification information, wherein the first notification information is used to notify a network device that the terminal device is capable of simultaneously transmitting information in a time period whose duration is the first time unit and a time period whose duration is the second time unit.

4. The method according to claim 1, wherein the method further comprises:
transmitting, by the terminal device, second notification information, wherein the second notification information is used to notify a network device that the terminal device is incapable of simultaneously transmitting information in a time period whose duration is the first time unit and a time period whose duration is the second time unit.

5. The method according to claim 1, wherein the method further comprises:
transmitting, by the terminal device, third notification information, wherein the third notification information is used to notify the network device that the terminal device is capable of transmitting information in a time period whose duration is the second time unit and capable of receiving information in a time period whose duration is the first time unit.

6. The method according to claim 1, wherein the method further comprises:
receiving, by the terminal device, second configuration information, wherein the second configuration information is used to configure the terminal device to be capable of transmitting information in a time period whose duration is the second time unit and capable of receiving information in a time period whose duration is the first time unit.

7. A terminal device, comprising:
a receiver, configured to receive first indication information in a first time period, wherein a duration of the first time period is a first time unit; and
a processor, configured to trigger, according to the first indication information, a transmitter to transmit first information in a second time period;
wherein the transmitter is configured to transmit the first information in the second time period;
wherein a duration of the second time period is a second time unit, and a duration of the second time unit is a duration of one timeslot, and a duration of the first time unit is less than a duration of one timeslot;
wherein an interval of K first time units exists between the second time period and the first time period, K is a positive integer;
wherein the receiver is further configured to receive second indication information; and
wherein the processor is further configured to trigger the transmitter to transmit second information in a third time period, wherein a duration of the third time period is the first time unit, and at least one part or an entirety of the third time period overlaps the second time period.

8. The terminal device according to claim 7, wherein a start position of a first symbol of the second time period is the same as a start position of a first symbol of a first subframe, and the first subframe is one of: (1) a subframe adjacent to a subframe comprising the first time period, (2) a subframe comprising a first time period which has an interval of K first time units with the first time period, or (3) a subframe adjacent to a subframe comprising a first time period which has an interval of K first time units with the first time period.

9. The terminal device according to claim 7, wherein the transmitter is further configured to:
transmit first notification information to a network device, wherein the first notification information is used to notify the network device that the terminal device is capable of simultaneously transmitting information in a time period whose duration is the first time unit and a time period whose duration is the second time unit.

10. The terminal device according to claim 7, wherein the transmitter is further configured to:
transmit second notification information to a network device, wherein the second notification information is used to notify the network device that the terminal device is incapable of simultaneously transmitting information in a time period whose duration is the first time unit and a time period whose duration is the second time unit.

11. The terminal device according to claim 7, wherein the transmitter is further configured to:
transmit third notification information to the network device, wherein the third notification information is used to notify the network device that the terminal device is capable of transmitting information in a time period whose duration is the second time unit and capable of receiving information in a time period whose duration is the first time unit.

12. The terminal device according to claim 7, wherein the receiver is further configured to receive second configuration information; and
wherein the processor is further configured to configure, according to the second configuration information, the terminal device to be capable of transmitting information in a time period whose duration is the second time unit and capable of receiving information in a time period whose duration is the first time unit.

13. A network device, comprising:
a processor, configured to determine first indication information; and
a transmitter, configured to transmit the first indication information to a terminal device in a first time period, wherein a duration of the first time period is a first time unit, the first indication information is used to trigger the terminal device to transmit first information in a second time period, a duration of the second time period is a second time unit, and a duration of the second time unit is a duration of one timeslot, and a duration of the first time unit is less than a duration of one timeslot;
wherein an interval of K first time units exists between the second time period and the first time period, K is a positive integer;
wherein the transmitter is further configured to:
transmit second indication information to the terminal device, wherein the second indication information is used to trigger the terminal device to transmit second information in a third time period, a duration of the third time period is the first time unit, and at least one part or an entirety of the third time period overlaps the second time period; and wherein the receiver is further configured to:
receive the second information transmitted by the terminal device in the third time period according to the second indication information.

14. The network device according to claim 13, wherein a start position of a first symbol of the second time period is the same as a start position of a first symbol of a first subframe, and the first subframe is one of: (1) a subframe adjacent to a subframe comprising the first time period, (2) a subframe comprising a first time period which has an interval of K first time units with the first time period, or (3) a subframe adjacent to a subframe comprising a first time period which has an interval of K first time units with the first time period.

15. The network device according to claim 13, further comprising a receiver, configured to receive the first information transmitted by the terminal device in the second time period.

16. The network device according to claim 13, further comprising the receiver, configured to receive first notification information transmitted by the terminal device;

wherein the processor is further configured to determine, according to the first notification information, that the terminal device is capable of simultaneously transmitting information in a time period whose duration is the first time unit and a time period whose duration is the second time unit.

17. The network device according to claim 13, further comprising a receiver, configured to receive second notification information transmitted by the terminal device;

wherein the processor is further configured to determine, according to the second notification information, that the terminal device is incapable of simultaneously transmitting information in a time period whose duration is the first time unit and a time period whose duration is the second time unit.

* * * * *